US012598140B2

(12) United States Patent
Sato et al.

(10) Patent No.: US 12,598,140 B2
(45) Date of Patent: Apr. 7, 2026

(54) CALCULATOR SYSTEM AND CONGESTION AVOIDANCE METHOD

(71) Applicant: Hitachi, Ltd., Tokyo (JP)

(72) Inventors: Katsuto Sato, Tokyo (JP); Toshiyuki Aritsuka, Tokyo (JP); Takafumi Kikuchi, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 300 days.

(21) Appl. No.: 18/239,961

(22) Filed: Aug. 30, 2023

(65) Prior Publication Data

US 2024/0236000 A1     Jul. 11, 2024

(30) Foreign Application Priority Data

Jan. 10, 2023     (JP) ................................. 2023-001858

(51) Int. Cl.
*H04L 47/10*     (2022.01)
*H04J 3/06*     (2006.01)
*H04L 7/00*     (2006.01)

(52) U.S. Cl.
CPC ............ *H04L 47/10* (2013.01); *H04J 3/0658* (2013.01); *H04L 7/0041* (2013.01)

(58) Field of Classification Search
CPC ....... H04L 47/10; H04L 7/0041; H04L 47/11; H04L 47/283; H04L 47/12; H04L 43/0852; H04J 3/0658
See application file for complete search history.

(56) References Cited

U.S. PATENT DOCUMENTS

| | | | | | |
|---|---|---|---|---|---|
| 5,815,667 | A | * | 9/1998 | Chien | H04L 47/35 709/224 |
| 9,185,045 | B1 | * | 11/2015 | Yang | H04W 28/0289 |
| RE50,543 | E | * | 8/2025 | Maeda | H04W 76/28 |
| 2002/0124096 | A1 | * | 9/2002 | Loguinov | H04L 9/40 370/352 |
| 2002/0172153 | A1 | | 11/2002 | Vernon | |
| 2009/0036109 | A1 | * | 2/2009 | Shintani | H04W 76/11 455/418 |

(Continued)

FOREIGN PATENT DOCUMENTS

JP     2016-515775 A     5/2016

OTHER PUBLICATIONS

Japanese Office Action received in corresponding Japanese Application No. 2023-001858 dated Mar. 18, 2025.

*Primary Examiner* — Afshawn M Towfighi
(74) *Attorney, Agent, or Firm* — MATTINGLY & MALUR, PC

(57)     ABSTRACT

A calculator system connected to a public network efficiently avoids congestion. The calculator system is connected to a network including a network switch, includes a plurality of calculators, and recovers, when a data packet is lost on the network, a transfer operation of the lost data packet by a retransmission operation. The calculator system includes the calculators; software running on the calculators; timing adjusting mechanism present between the calculators and the network. The timing adjusting mechanism is configured to calculate a delay time for delaying transmission of a data packet transmitted from the software based on characteristics of the data packet, and delay the transmission of the data packet by the calculated delay time.

7 Claims, 36 Drawing Sheets

(56) References Cited

U.S. PATENT DOCUMENTS

| | | | | |
|---|---|---|---|---|
| 2016/0056927 | A1* | 2/2016 | Liu | H04L 47/746 |
| | | | | 370/216 |
| 2016/0218984 | A1* | 7/2016 | Nishikawa | H04L 1/1858 |
| 2016/0323062 | A1* | 11/2016 | Yang | H04L 12/66 |

* cited by examiner

Figure 9:
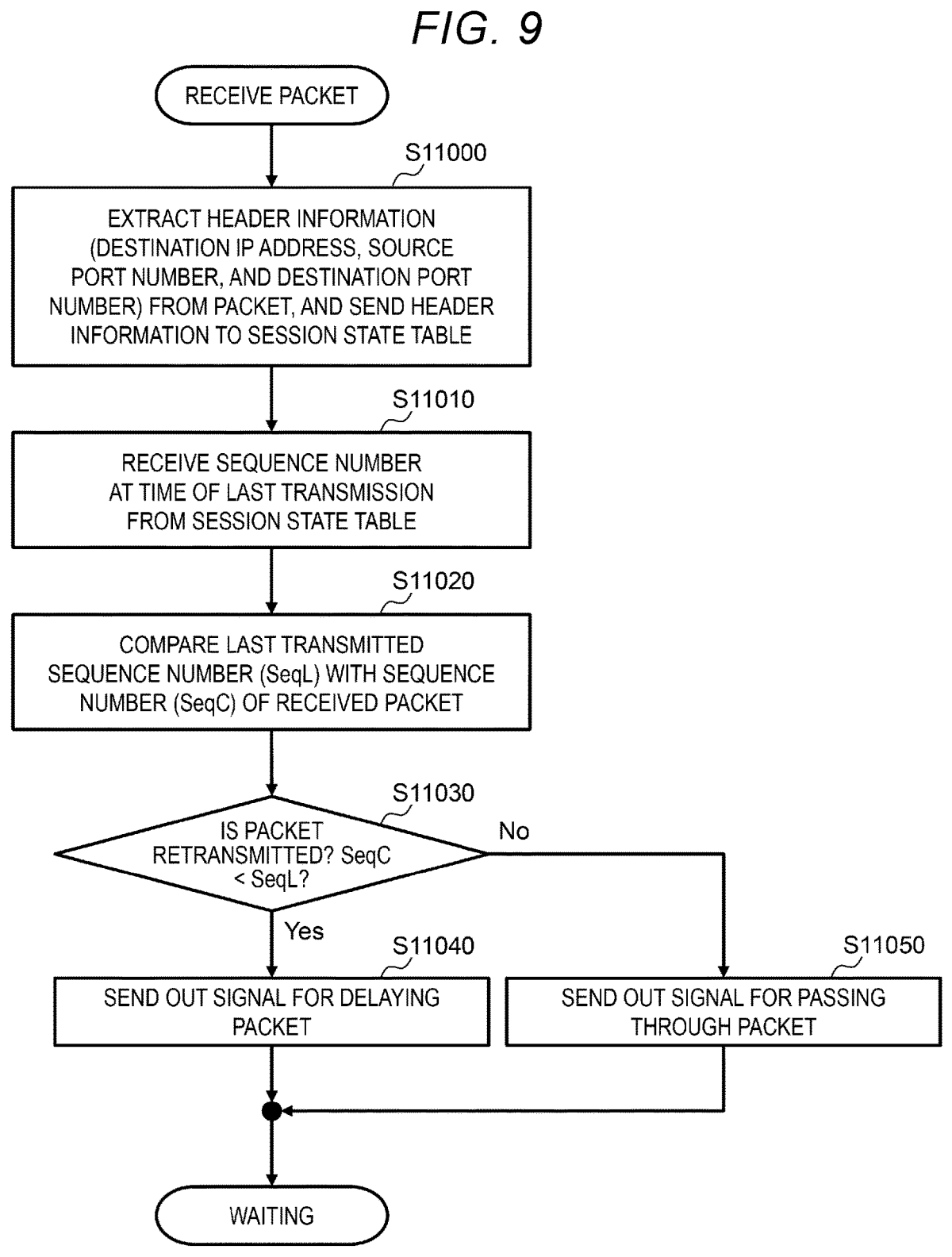

RECEIVE PACKET

S11000

EXTRACT HEADER INFORMATION
(DESTINATION IP ADDRESS, SOURCE
PORT NUMBER, AND DESTINATION PORT
NUMBER) FROM PACKET, AND SEND HEADER
INFORMATION TO SESSION STATE TABLE

S11010

RECEIVE SEQUENCE NUMBER
AT TIME OF LAST TRANSMISSION
FROM SESSION STATE TABLE

S11020

COMPARE LAST TRANSMITTED
SEQUENCE NUMBER (SeqL) WITH SEQUENCE
NUMBER (SeqC) OF RECEIVED PACKET

S11030

IS PACKET
RETRANSMITTED? SeqC
< SeqL?

No

Yes

S11040

SEND OUT SIGNAL FOR DELAYING
PACKET

S11050

SEND OUT SIGNAL FOR PASSING
THROUGH PACKET

WAITING

FIG. 14

| Destination IP Address | Source Port Number | Destination Port Number | Sequence ID |
|---|---|---|---|
| 192.168.0.1 | 1234 | 4095 | 12 |

Query

1200 session state table

| Destination IP Address | Source Port Number | Destination Port Number | Last Sequence # |
|---|---|---|---|
| 192.168.0.1 | 1234 | 4095 | 11 |
| 192.168.0.1 | 5678 | 4096 | 17 |
| 192.168.100.200 | 5368 | 2269 | 13 |
| 192.168.10.201 | 2793 | 2204 | 19 |
| 192.168.10.202 | 6976 | 1343 | 29 |

| Last Sequence ID |
|---|
| 11 |

*FIG. 16*

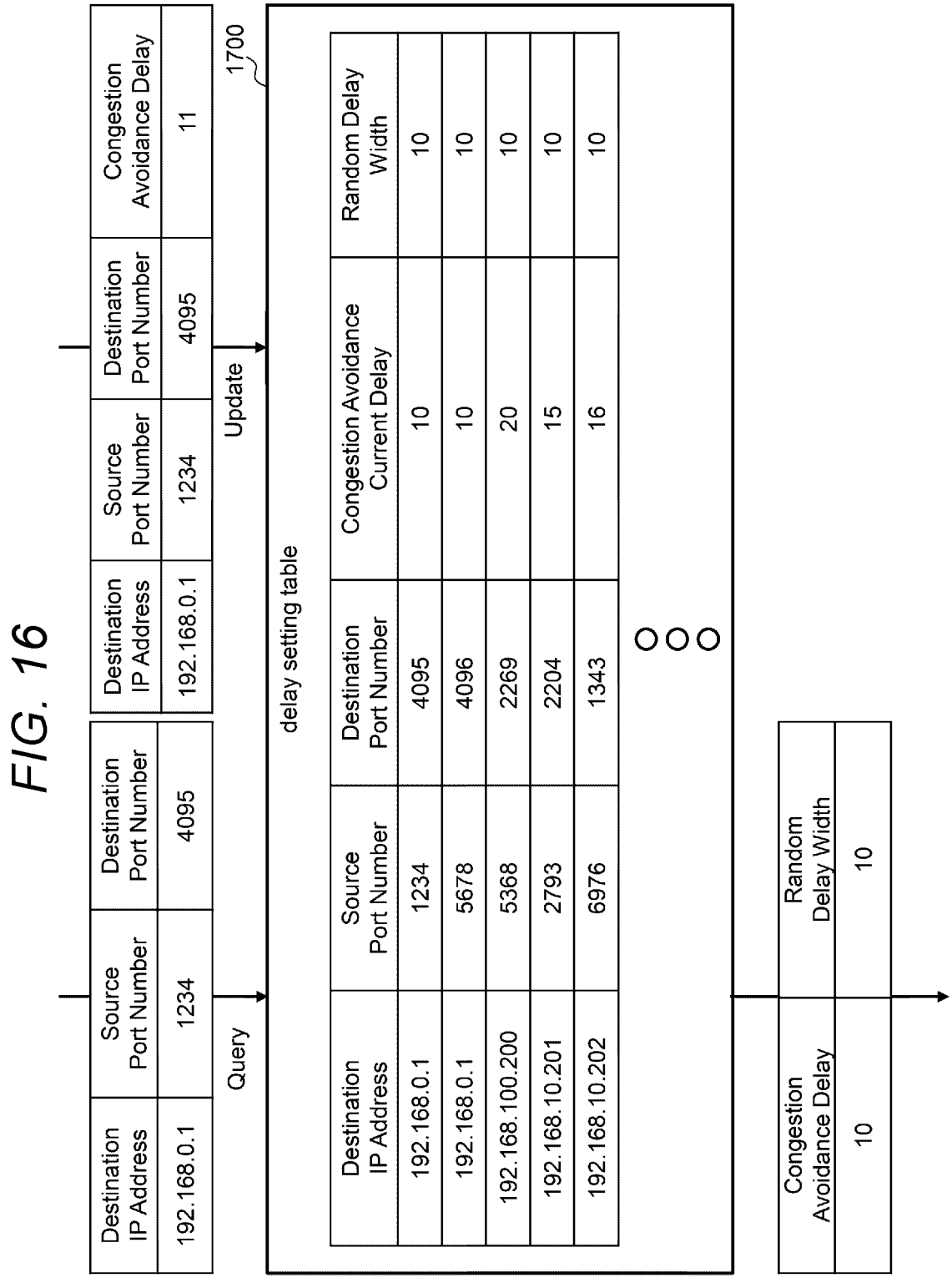

| Destination IP Address | Source Port Number | Destination Port Number | Congestion Avoidance Delay |
|---|---|---|---|
| 192.168.0.1 | 1234 | 4095 | 11 |

1700

| Destination IP Address | Source Port Number | Destination Port Number |
|---|---|---|
| 192.168.0.1 | 1234 | 4095 |

Query

Update delay setting table

| Destination IP Address | Source Port Number | Destination Port Number | Congestion Avoidance Current Delay | Random Delay Width |
|---|---|---|---|---|
| 192.168.0.1 | 1234 | 4095 | 10 | 10 |
| 192.168.0.1 | 5678 | 4096 | 10 | 10 |
| 192.168.100.200 | 5368 | 2269 | 20 | 10 |
| 192.168.10.201 | 2793 | 2204 | 15 | 10 |
| 192.168.10.202 | 6976 | 1343 | 16 | 10 |

○○○

| Congestion Avoidance Delay | Random Delay Width |
|---|---|
| 10 | 10 |

FIG. 18

| Destination IP Address | Source Port Number | Destination Port Number | Sequence ID |
|---|---|---|---|
| 192.168.0.1 | 1234 | 4095 | 11 |

1600 delay history table

| Destination IP Address | Source Port Number | Destination Port Number | Sequence Number | Count |
|---|---|---|---|---|
| 192.168.0.1 | 1234 | 4095 | 11 | 1 |
| 192.168.0.1 | 5678 | 4096 | 17 | 1 |
| 192.168.100.200 | 5368 | 2269 | 13 | 2 |
| 192.168.0.1 | 1234 | 4095 | 10 | 1 |
| 192.168.10.202 | 6976 | 1343 | 29 | 1 |

○
○
○

| Count |
|---|
| 2 |

FIG. 19

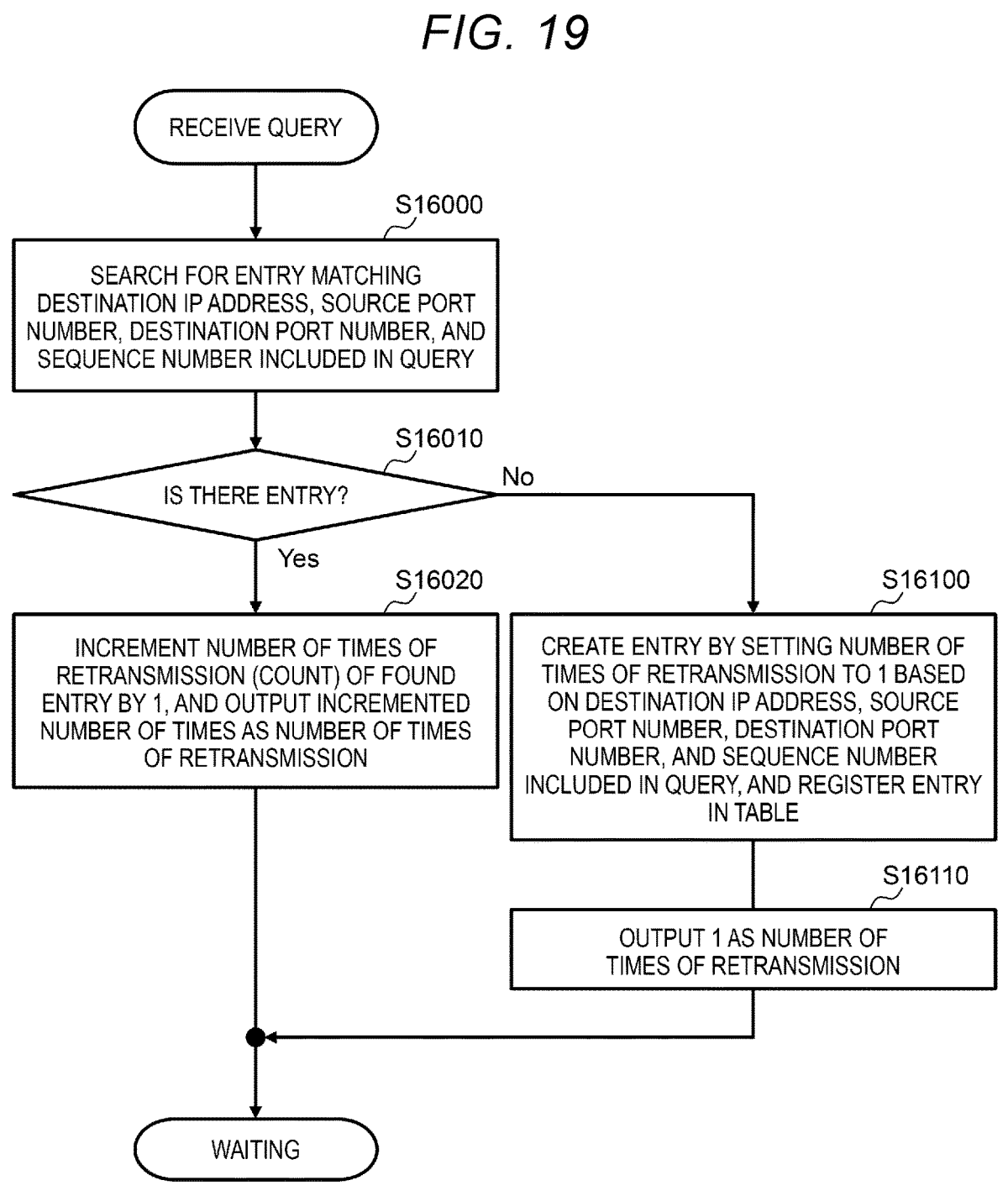

```
                    ┌─────────────────┐
                    │  RECEIVE QUERY   │
                    └────────┬─────────┘
                             │              S16000
                             ▼
        ┌──────────────────────────────────────────┐
        │       SEARCH FOR ENTRY MATCHING           │
        │  DESTINATION IP ADDRESS, SOURCE PORT      │
        │  NUMBER, DESTINATION PORT NUMBER, AND     │
        │  SEQUENCE NUMBER INCLUDED IN QUERY        │
        └────────────────────┬─────────────────────┘
                             │              S16010
                             ▼
                   ◇─────────────────◇        No
                    IS THERE ENTRY?   ─────────────────┐
                   ◇─────────────────◇                 │
                             │ Yes                      │
                  S16020     │               S16100     │
                             ▼                          ▼
   ┌───────────────────────────────┐   ┌───────────────────────────────┐
   │  INCREMENT NUMBER OF TIMES OF  │   │  CREATE ENTRY BY SETTING NUMBER OF │
   │  RETRANSMISSION (COUNT) OF FOUND│  │  TIMES OF RETRANSMISSION TO 1 BASED│
   │  ENTRY BY 1, AND OUTPUT INCREMENTED│ ON DESTINATION IP ADDRESS, SOURCE │
   │  NUMBER OF TIMES AS NUMBER OF TIMES│ PORT NUMBER, DESTINATION PORT     │
   │  OF RETRANSMISSION             │   │  NUMBER, AND SEQUENCE NUMBER       │
   └───────────────┬───────────────┘   │  INCLUDED IN QUERY, AND REGISTER ENTRY│
                   │                    │           IN TABLE                 │
                   │                    └───────────────┬───────────────────┘
                   │                         S16110     │
                   │                                    ▼
                   │                    ┌───────────────────────────────┐
                   │                    │     OUTPUT 1 AS NUMBER OF      │
                   │                    │    TIMES OF RETRANSMISSION     │
                   │                    └───────────────┬───────────────┘
                   │                                    │
                   ●◄───────────────────────────────────┘
                   │
                   ▼
           ┌───────────────┐
           │    WAITING     │
           └───────────────┘
```

CALCULATOR SYSTEM AND CONGESTION AVOIDANCE METHOD

CROSS-REFERENCE TO RELATED APPLICATION

The present application claims priority from Japanese application JP2023-001858, filed on Jan. 10, 2023, the content of which is hereby incorporated by reference into this application.

BACKGROUND OF THE INVENTION

1. Field of the Invention

The present invention relates to a calculator system and a congestion avoidance method.

2. Description of Related Art

Cloud computing is an attractive technique that can provide an IT service without having a hardware resource and can obtain a calculation capability with high flexibility for a load. In recent years, business software requiring high reliability has also been attempted to be implemented on a cloud, and it is expected that cloud utilization will continue expanding in the future.

Since public clouds that can be used by various people are used in a form in which different users are assigned the same hardware and share the hardware, it is a problem to ensure performance and reliability. Although resources (CPU, memory, and the like) to be closed in a calculator are separated between the users by utilizing a hardware support function, there is a part of a network in which band limitation or the like is performed, but an influence on other parts cannot be avoided in a generally used Ethernet technique. Network congestion is one of unavoidable influences, and is known as a phenomenon in which a part of communication cannot be performed when an amount of communication of the users is concentrated on a bandwidth or higher that can be provided by a shared communication path.

It is known that a transmitted packet is lost in such congestion. Since a reception side cannot know that the packet has been lost, a procedure of setting a timeout for a case in which there is no response from the reception side for a certain time on a transmission side and retransmitting the packet after a timeout time has elapsed is defined as a standard. Such a retransmission operation is implemented by driver software incorporated in an operating system. However, in a use form such as video streaming in which a delay is important, a timeout until retransmission is too long depending on a retransmission function of the OS, which may affect provision of the function. In such a case, as described in PTL 1, the timeout is managed on an application side, and retransmission is actively performed at a timing earlier than the retransmission function of the OS, and thus an influence of packet loss can be reduced.

The packet loss due to congestion is handled by appropriately performing retransmission as described above, but there is also a problem that cannot be solved by simple retransmission in the public cloud.

CITATION LIST

Patent Literature

PTL 1: JP2016-515775A

SUMMARY OF THE INVENTION

The retransmission as a countermeasure against the packet loss at the time of congestion occurrence is an effective measure, but when congestion occurs in the communication path shared by a large number of transmission and reception entities (instances) such as the public cloud, a phenomenon in which retransmission consecutively fails may occur. The phenomenon occurs when retransmission operations of the instances are all operated under the same rule. When packet loss occurs in the plurality of instances and retransmission is simultaneously started after a timeout time has elapsed by the retransmission function of the OS, the congestion occurs again when a large number of retransmitted packets are simultaneously concentrated on a specific switch, thereby causing the packet loss. The phenomenon occurs many times between the instances in which the retransmission operations are performed in the same procedure, and as a result, a phenomenon occurs in which an unexpectedly long time is required until the retransmission succeeds. Since the retransmission operation of the OS is hidden when viewed from the application, it is observed from the application that a communication delay time suddenly extends abnormally. Since it is determined that the communication path is operating normally during this period, an abnormal communication delay in a normal state may have an unexpected influence on the application, which may lead to erroneous detection of a failure in some cases.

Although a probability of being involved in the event can be reduced by changing the timeout until retransmission for each instance, changing an operation f the retransmission function of the OS affects the entire system, and thus it is difficult to evaluate the influence. In addition, it is difficult to modify the retransmission operation of the OS in terms of maintenance cost.

Therefore, in the calculator system that is the instance connected to the public network, it is important to efficiently avoid congestion without changing the OS or the application.

In order to achieve the above object, one typical calculator system of the present invention is a calculator system, which is connected to a network including a network switch, includes a plurality of calculators, and recovers, when a data packet is lost on the network, a transfer operation of the lost data packet by a retransmission operation. The calculator system includes the calculators; software running on the calculators; and a timing adjusting mechanism present between the calculators and the network. The timing adjusting mechanism is configured to calculate a delay time for delaying transmission of a data packet transmitted from the software based on characteristics of the data packet, and delay the transmission of the data packet by the calculated delay time.

In addition, one typical congestion avoidance method of the present invention is a congestion avoidance method for a calculator system, and the calculator system is connected to a network including a network switch, includes a plurality of calculators, and recovers, when a data packet is lost on the network, a transfer operation of the lost data packet by a retransmission operation. A timing adjusting mechanism present between the network and the calculators on which software is running is configured to acquire characteristics of a data packet transmitted from the software, calculate a delay time for delaying transmission of the data packet based on the characteristics of the data packet, and delay the transmission of the data packet by the calculated delay time.

According to the present invention, it is possible to efficiently avoid congestion. Problems, configurations, and effects other than those described above will be clarified by the following description of embodiments.

BRIEF DESCRIPTION OF THE DRAWINGS

FIG. 4 is a continuous retransmission failure occurrence state diagram due to congestion;

FIG. 6 is a configuration diagram of a delay adjusting system;

FIG. 9 is an operating flowchart of the retransmission confirmation mechanism;

FIG. 14 is a configuration diagram of a session state table;

FIG. 16 is a configuration diagram of a delay setting table;

FIG. 18 is a configuration diagram of a delay history table;

FIG. 19 is an operating flowchart of the delay history table;

FIG. 24 is a diagram illustrating a congestion time;

FIG. 30 is an operating flowchart of the delay adjuster according to Embodiment 3;

DESCRIPTION OF EMBODIMENTS

The present invention is implemented in a network system including two or more calculator systems and a network including network switches connecting the calculator systems.

Figure 2:
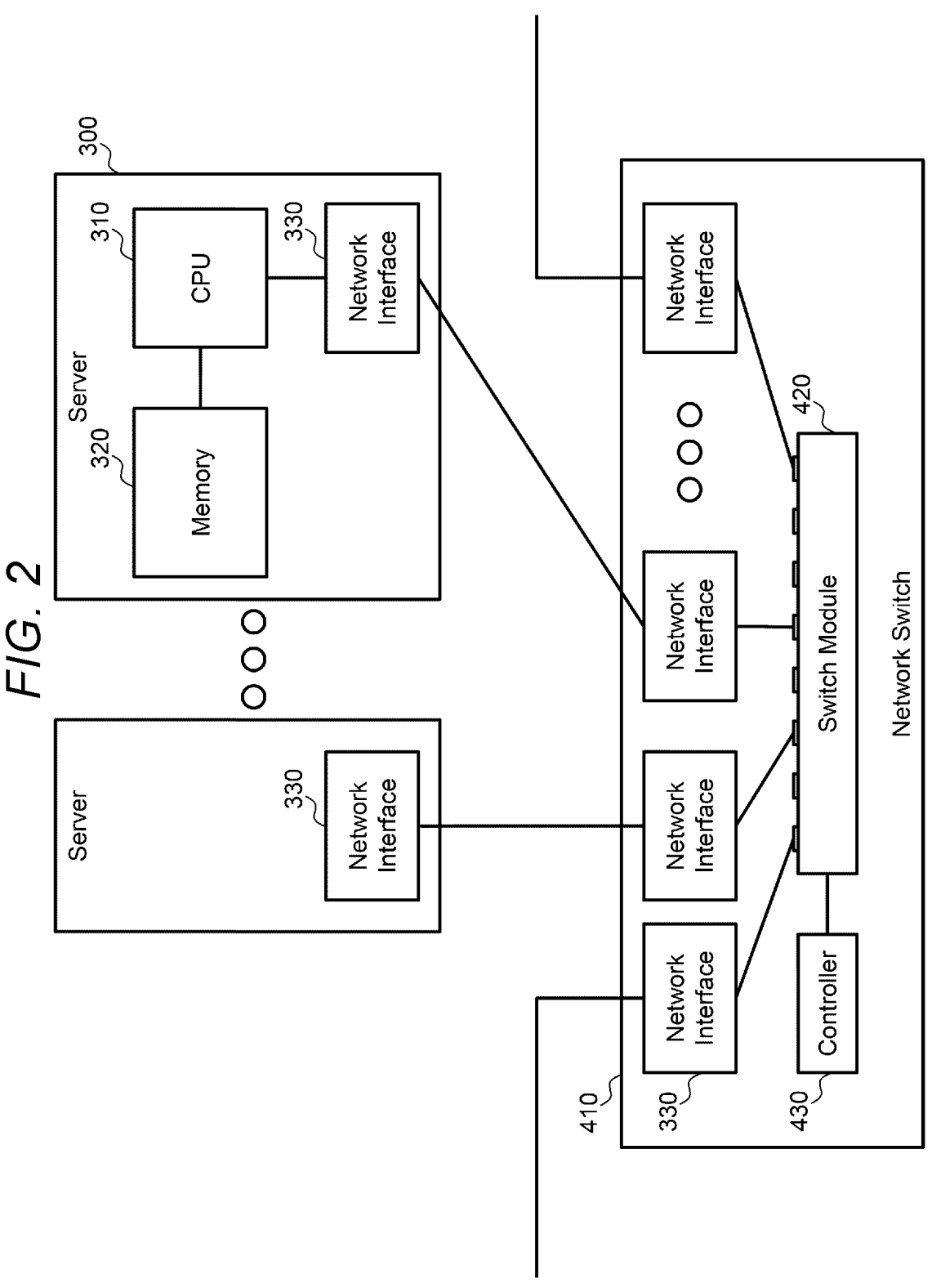
FIG. 2 is a hardware configuration diagram according to Embodiment 1.

FIG. 2 is a schematic configuration diagram of hardware. There are a plurality of servers 300 each including a central processing unit 310, a main memory 320, and a network interface 330, and a network switch 410 including the network interfaces 330, a switch module 420, and a switch controller 430 is connected to the servers by network cables to configure a network system. In principle, the present invention is assumed to be executed as software installed in the main memory 320 by the central processing unit 310 mounted on the server, but dedicated hardware for performing the same operation may be separately mounted on the server or the network switch. Alternatively, the present invention may be implemented by being executed as firmware on the switch controller 430 of the network switch 410.

Figure 3:
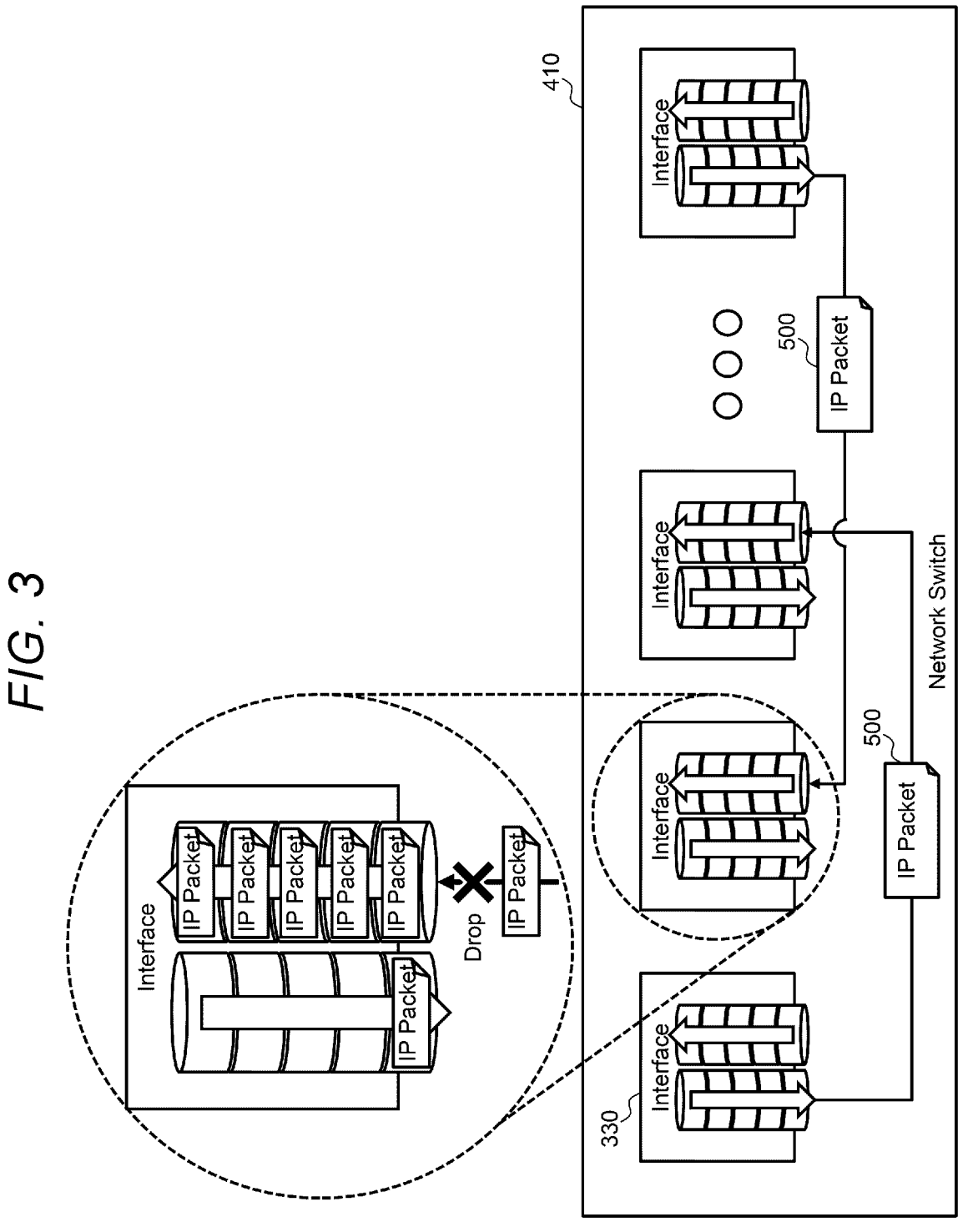
FIG. 3 is a state diagram at the time of congestion in a network switch.

FIG. 3 is a diagram illustrating a phenomenon in which a packet is lost due to congestion, which is assumed in the present invention. There is an input and output buffer for each network interface 330, and when a situation continues in which a packet 500 arrives at an output buffer from the other network interface 330 at a speed faster than a speed at which data is transferred from the output buffer to the other network switch 410 or the server 300, a situation occurs in which the output buffer becomes full and the packet 500 cannot be added to the output buffer. When the output buffer of the specific network interface 330 becomes full and the packet 500 cannot be added, the packet 500 to be added is discarded in many cases, and the packet 500 is lost. Such a situation is called congestion, and communication cannot be performed normally. A congestion state is resolved when the buffer becomes empty as a time passes and the transfer of the packets 500 in the output buffer progresses, but the packet 500 arriving until the congestion state is resolved is lost.

Accordingly, it is a standard operation that the lost packet 500 is detected by a source timeout setting when a normal response is not returned from a destination for a certain period of time, and is recovered when the same packet is retransmitted. Therefore, a countermeasure is taken such that communication does not immediately fail even though congestion occurs.

Figure 4:
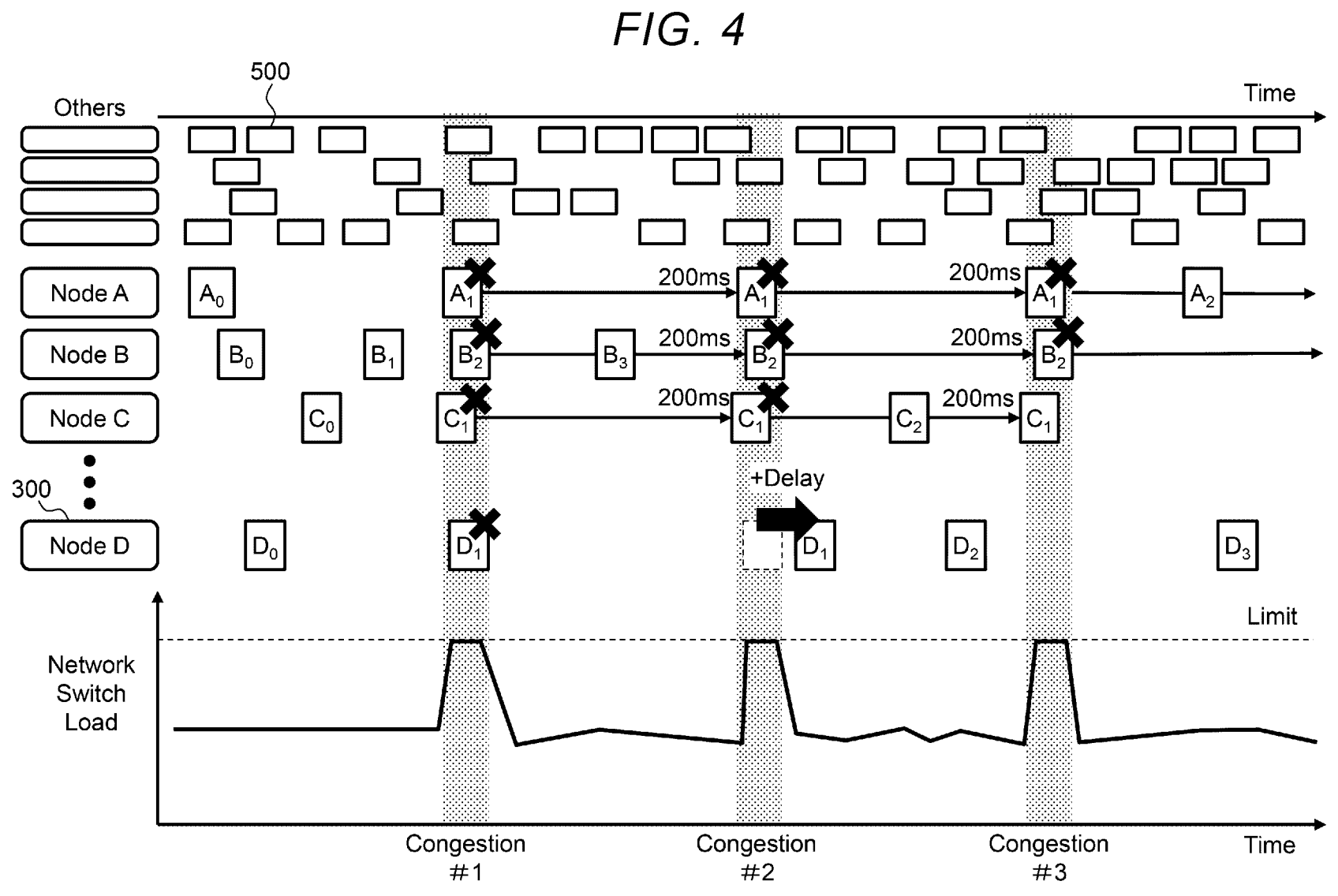

FIG. 4 is a schematic diagram of a situation in which a large number of packets 500 are transmitted from a large number of servers 300 (described as nodes in the figure) to a certain network switch 410. When the packets 500 transmitted from the respective servers 300 overlap at a certain time point, a load of the network switch 410, that is, an operating rate of the output buffer may increase to a limit and enter a congestion state. At this time, the plurality of packets 500 may be lost at once. The lost packets 500 are recovered by being retransmitted by the respective servers 300 after a certain period of time elapses, and when retransmission times are set to be the same in a case in which all the nodes A/B/C (300a, 300b, and 300c) use the same type of operating system, the packets 500 are retransmitted at the same timing. At this time, depending on a state of the network, a phenomenon occurs in which re-congestion occurs due to retransmission, and the packets 500 are lost again. While the phenomenon is repeated several times, as in the case of the node C (300c) in FIG. 4, there may be no involvement in simultaneous retransmission due to a deviation in time until retransmission. In addition, even if an amount of communication from the other nodes 300 decreases and congestion occurs, some of the retransmitted packets 500 may arrive without being lost. Accordingly, the congestion caused by the retransmission gradually subsides, but as in the case of the node A (300a), the retransmission may fail continuously due to being involved in the re-congestion many times. Such an event in which the retransmission fails consecutively and the retransmission is repeated many times is not recognized by an application 100 that performs communication, but is simply observed as if a communication delay time is extended. In the application 100 in which the communication delay time has a fatal influence, the occurrence of such an event may have a fatal influence on the continuation of the operation of the application 100. For example, in a case of an alive monitoring communication, although a partner server is being operated, the alive confirmation communication may be wrongly recognized as a failure due to a long time delay. Such a problem cannot be dealt with by a simple retransmission operation.

In order to deal with an abnormal communication delay due to a continuous retransmission failure, it is effective to adjust a transmission timing. Since simultaneous retransmission made by a large number of servers 300 at the time of retransmission is a cause of occurrence of re-congestion, by adjusting the retransmission time, the packets 500 are prevented from suddenly concentrating on the network switch 410, and the re-congestion is reduced.

Figure 5:
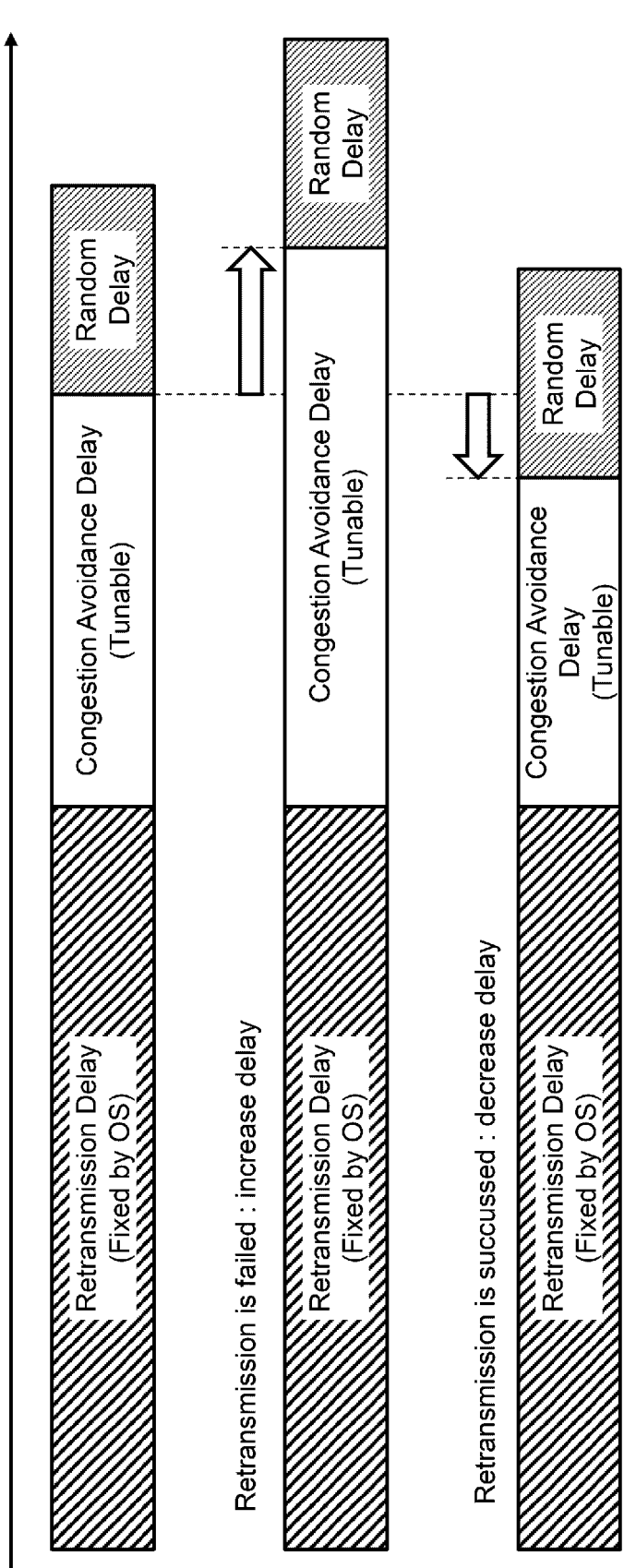
FIG. 5 is a conceptual diagram of adjusting a delay time.

FIG. 5 is a conceptual diagram of adjusting a transmission delay time. In addition to a retransmission delay caused by a predetermined operation of a normal OS or the like, a delay for avoiding congestion and a random delay for preventing the concentration of the packets 500 are added to adjust a packet transmission interval. Since an appropriate congestion avoidance delay time varies depending on the state of the network, it is desirable to dynamically adjust the congestion avoidance delay time. For example, the congestion avoidance delay time is adjusted by extending a congestion avoidance time when the retransmission fails consecutively a threshold number of times or more and reducing the congestion avoidance time when the number of times of successful retransmission reaches a threshold or more. By using a timing adjusting system 1000 that adjusts a transmission timing of the packets 500, it is possible to prevent continuous retransmission failures and an abnormal increase in communication delay associated therewith.

In the following description, one or more timing adjusting systems may be present for each server 300 or each instance. The individual timing adjusting system 1000 may be applied to each application 100 or may be shared by the plurality of applications 100. In the following description, a common part in reference numerals may be used when elements of the same type are described without distinction, and individual reference numerals may be used when the elements of the same type are distinguished.

Embodiment 1

Basic Embodiment

Figure 1:
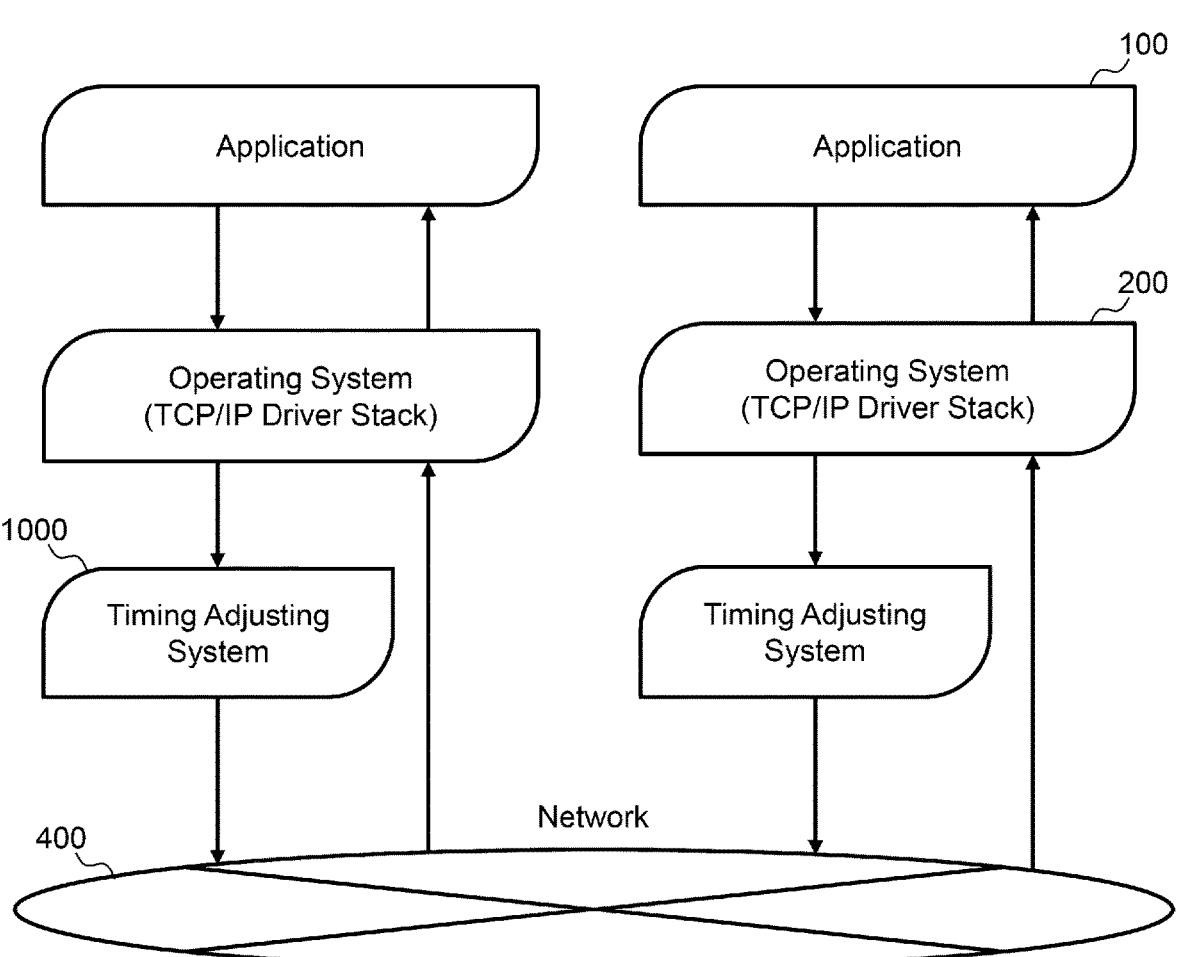
FIG. 1 is a system conceptual diagram according to Embodiment 1.

FIG. 1 shows an outline of a flow of a packet including data in an embodiment of the present invention. In order to transmit data generated by an application 100a to an application 100b operating in another place, the packet including data is generated, and an operating system 200 is instructed to transmit the packet using a system call or the like. The operating system 200 sends out the packet 500 to a network 400 in order to send a packet to a destination according to an instruction, and passes through the timing adjusting system 1000 for adjusting a send-out delay on a send-out path, thereby reducing the continuous retransmission failures due to re-congestion. The timing adjusting system 1000 may operate as a part of a function of the operating system 200, or may operate as a dedicated device physically separated from the server 300.

Figure 6:
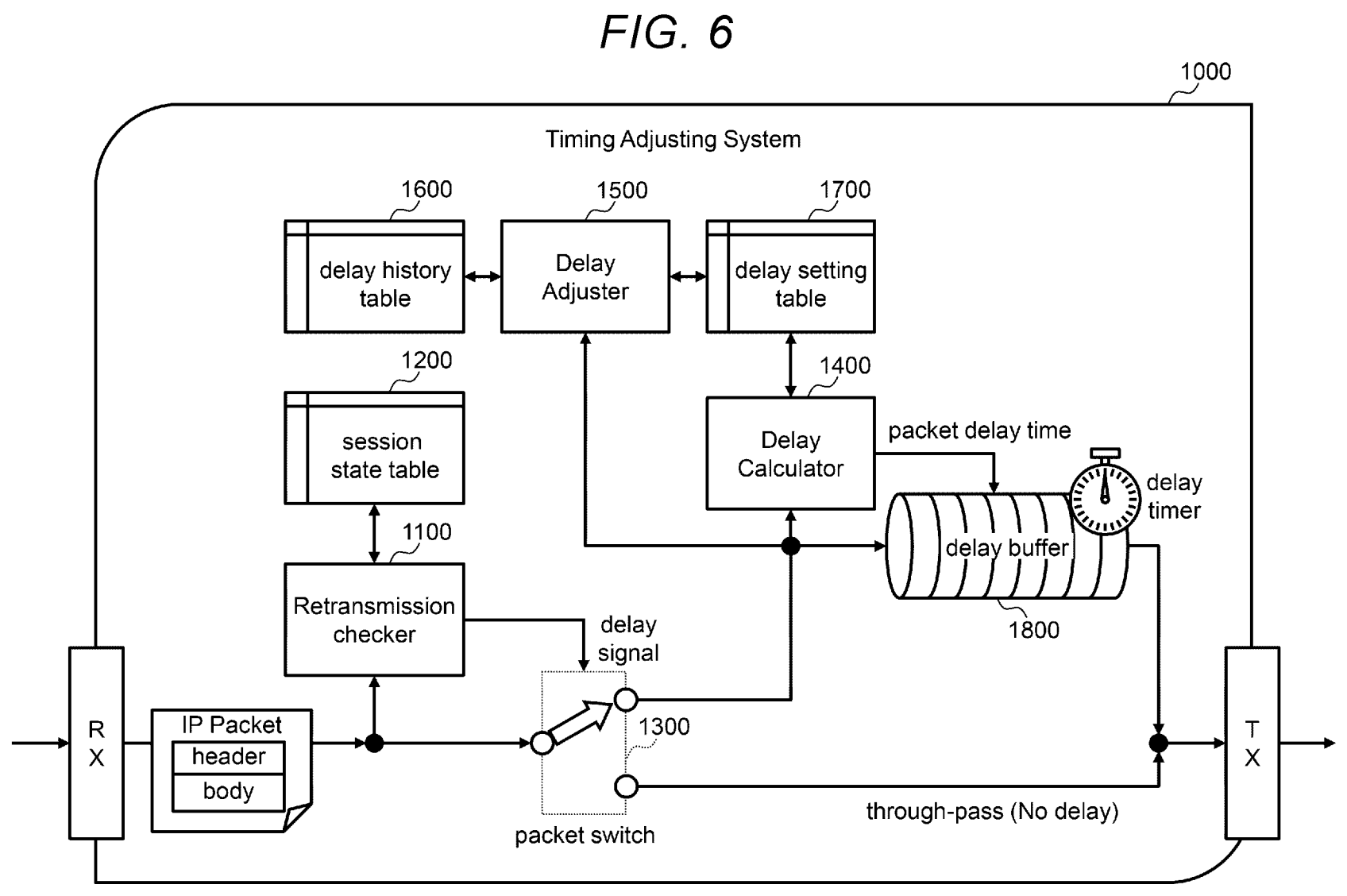

FIG. 6 shows a configuration of the timing adjusting system 1000. The timing adjusting system 1000 includes the following components. A retransmission confirmation mechanism 1100 determines whether the transmitted packet 500 is a retransmitted packet based on information on a session state table 1200, and instructs a packet switch 1300 to distribute the packets 500 to a path for adjusting a transmission timing when the packet 500 is the retransmitted packet. The session state table 1200 provides information on a state of a session in which a packet is transmitted from information stored in a header of the packet to the retransmission confirmation mechanism 1100. The packet switch 1300 controls, based a on signal from the retransmission confirmation mechanism 1100, whether to make the packet flow to a path through which the packet passes or to make the packet flow to the path for adjusting the transmission timing. The delay calculator 1400 makes an inquiry to a delay setting table 1700 using the header information of the packet 500, calculates how much transmission is delayed for the packet 500, and notifies a delay buffer 1800 of a delay time. The delay buffer 1800 accumulates the arrived packets 500 based on the delay time of the packet notified from the delay calculator 1400, and transmits the packets after the delay time elapses. A delay adjuster 1500 makes an inquiry to a delay history table 1600 and the delay setting table 1700 based on the information stored in the header of the packet, adjusts a current delay setting based on history information, and sets a new delay setting in the delay setting table 1700.

Figure 7:
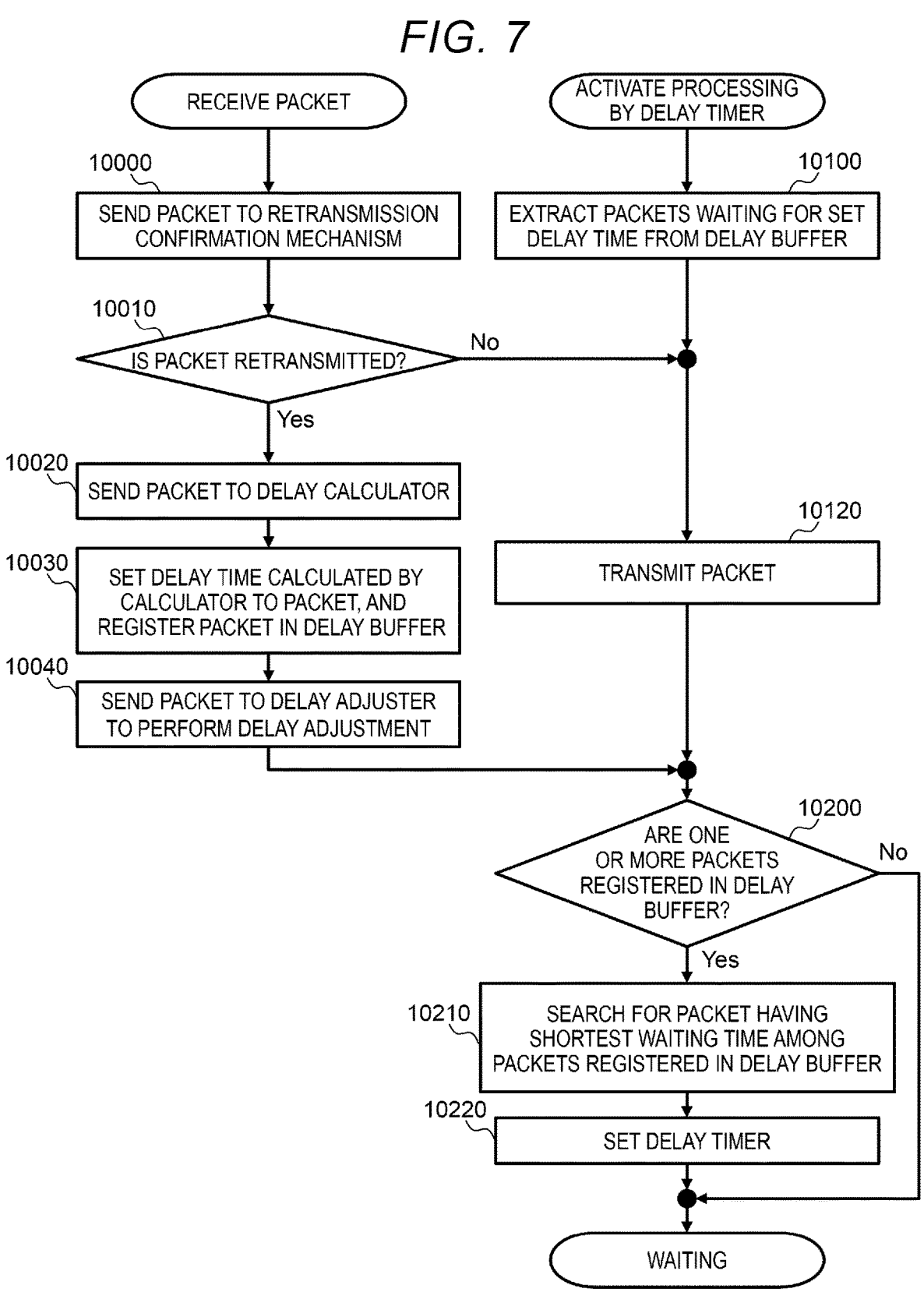
FIG. 7 is an operating flowchart of the delay adjusting system.

FIG. 7 is an operating flowchart of the timing adjusting system 1000. The flowchart shown in FIG. 7 is activated by receiving a packet or by a delay timer. Processing starts from step 10000 when a packet is received, and starts from step 10100 when being activated by the delay timer.

Step 10000: The timing adjusting system 1000 sends the received packet to the retransmission confirmation mechanism 1100, and the process proceeds to step 10010.

Step 10010: The retransmission confirmation mechanism 1100 confirms whether the packet is retransmitted. If the packet is retransmitted, the process proceeds to step 10020. If the packet is not retransmitted, the process proceeds to step 10120.

Step 10020: The packet switch 1300 sends the packet to the delay calculator 1400. Thereafter, the process proceeds to step 10030.

Step 10030: The delay calculator 1400 calculates a delay time for the sent packet, sets the calculated delay time to the packet, and registers the packet in the delay buffer 1800. Thereafter, the process proceeds to step 10040.

Step 10040: The packet switch 1300 sends the packet to the delay adjuster 1500 to perform delay adjustment. Thereafter, the process proceeds to step 10200.

Step 10120: The timing adjusting system 1000 transmits a packet. Thereafter, the process proceeds to step 10200.

Step 10200: The timing adjusting system determines whether one or more packets are registered in the delay buffer 1800. If no packet is registered, the process returns to a waiting state. If a packet is registered, the process proceeds to step 10210.

Step 10210: The timing adjusting system 1000 searches for a packet having the shortest waiting time among the packets registered in the delay buffer 1800, and the process proceeds to step 10220.

Step 10220: The timing adjusting system 1000 sets a delay timer for the packet having the shortest waiting time, and the process returns to the waiting state.

Step 10100: If the processing is activated by the delay timer, the timing adjusting system 1000 extracts packets waiting for the set delay time from the delay buffer, and the process proceeds to step 10120.

Figure 8:
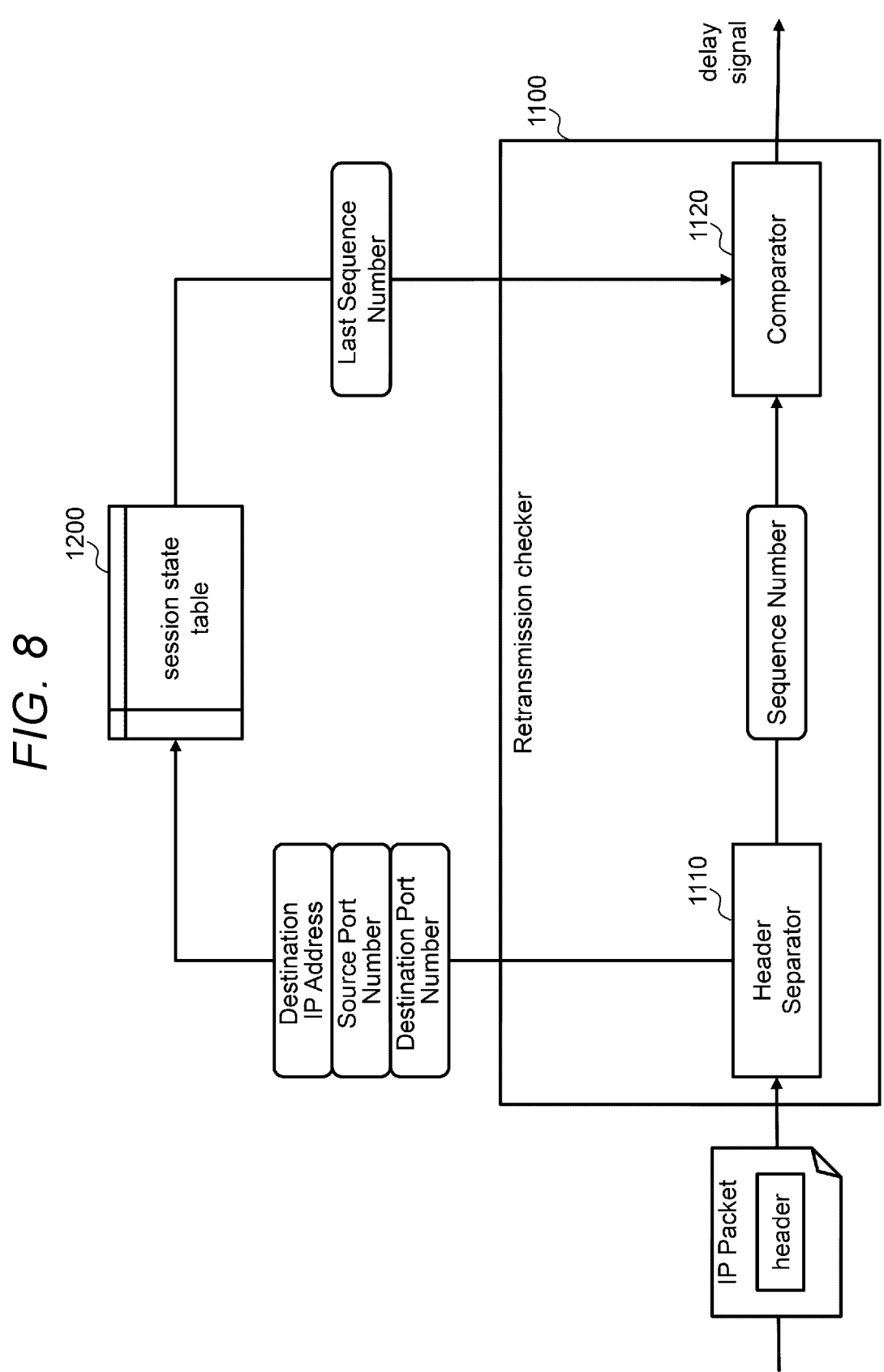
FIG. 8 is a configuration diagram of a retransmission confirmation mechanism.

FIG. 8 shows a configuration of the retransmission confirmation mechanism 1100. The retransmission confirmation mechanism includes a header separator 1110 that extracts a part of the header from the packet 500, and a comparator 1120 that compares a last sequence number acquired from the session state table 1200 with a sequence number of the packet. When the last sequence number is equal to or greater than the sequence number included in the packet, the comparator 1120 determines that the packet is retransmitted, and sends out a signal indicating that the packet is to be inserted with a transmission delay. The sequence number that can be stored in the packet 500 may return to zero after one cycle due to the limitation of a stored data size. In order to deal with the above problem, a larger data size for storing the last sequence number in the session state table 1200 may be secured than a data size of the packet. When it is detected that the packet is circulated once, the data size for storing the last sequence number may be identified by adding a digit higher than that of the data size of the packet.

FIG. 9 shows an operating flowchart of the retransmission confirmation mechanism 1100. When the packet is received, the retransmission confirmation mechanism 1100 sequentially executes processing of steps 11000 to 11050.

Step 11000: The header separator 1110 of the retransmission confirmation mechanism 1100 extracts header information (destination IP address, source port number, and destination port number) from the packet, and sends the header information to a session state table. Thereafter, the process proceeds to step 11010.

Step 11010: The retransmission confirmation mechanism 1100 receives a sequence number at the time of last transmission from the session state table. Thereafter, the process proceeds to step 11020.

Step 11020: The comparator 1120 compares a last transmitted sequence number (SeqL) with a sequence number (SeqC) of the received packet. Thereafter, the process proceeds to step 11030.

Step 11030: As a result of the comparison by the comparator 1120, if SeqC<SeqL, it is determined to be retransmission, and the process proceeds to step 11040. If SeqC≥SeqL, the process proceeds to step 11050.

Step 11040: The retransmission confirmation mechanism 1100 sends out a signal for delaying the packet, and the process returns to the waiting state.

Step 11050: The retransmission confirmation mechanism 1100 sends out a signal for passing through the packet without delay, and the process returns to the waiting state.

Figure 10:
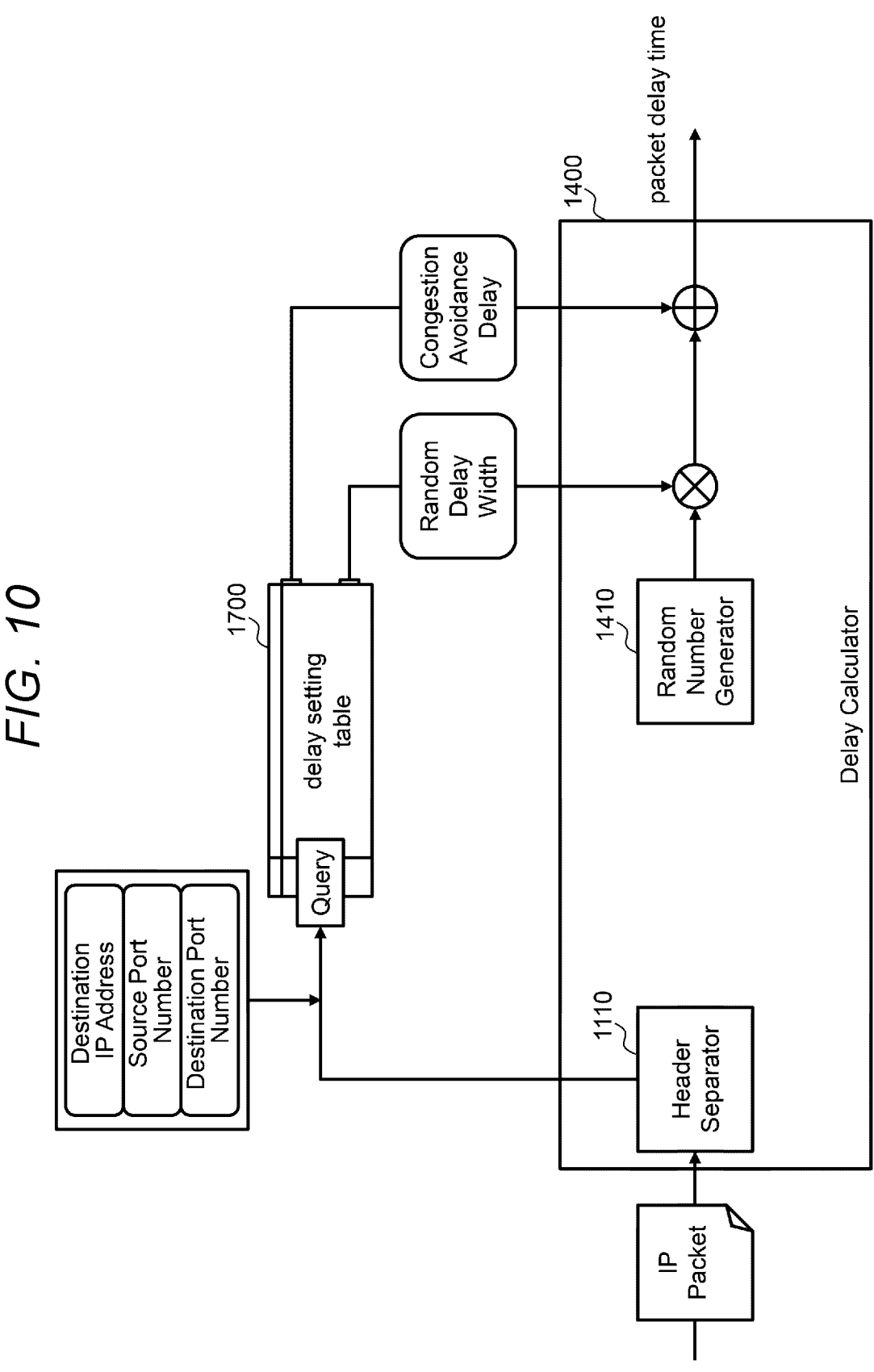
FIG. 10 is a configuration diagram of a delay calculator according to Embodiment 1.

FIG. 10 shows a configuration of the delay calculator 1400. The delay calculator 1400 includes the header separator 1110, a random number generator 1410, a multiplier that multiplies a random delay width, and an adder that adds a congestion avoidance delay. The header information extracted by the header separator 1110 is sent to the delay setting table 1700, and setting values of the random delay width and a congestion avoidance delay time are received. A random number generated from the random number generator 1410 is multiplied by the random delay width to calculate a random delay time. The random delay time and the congestion avoidance delay time are added, and a packet transmission delay time is output to the outside.

Figure 11:
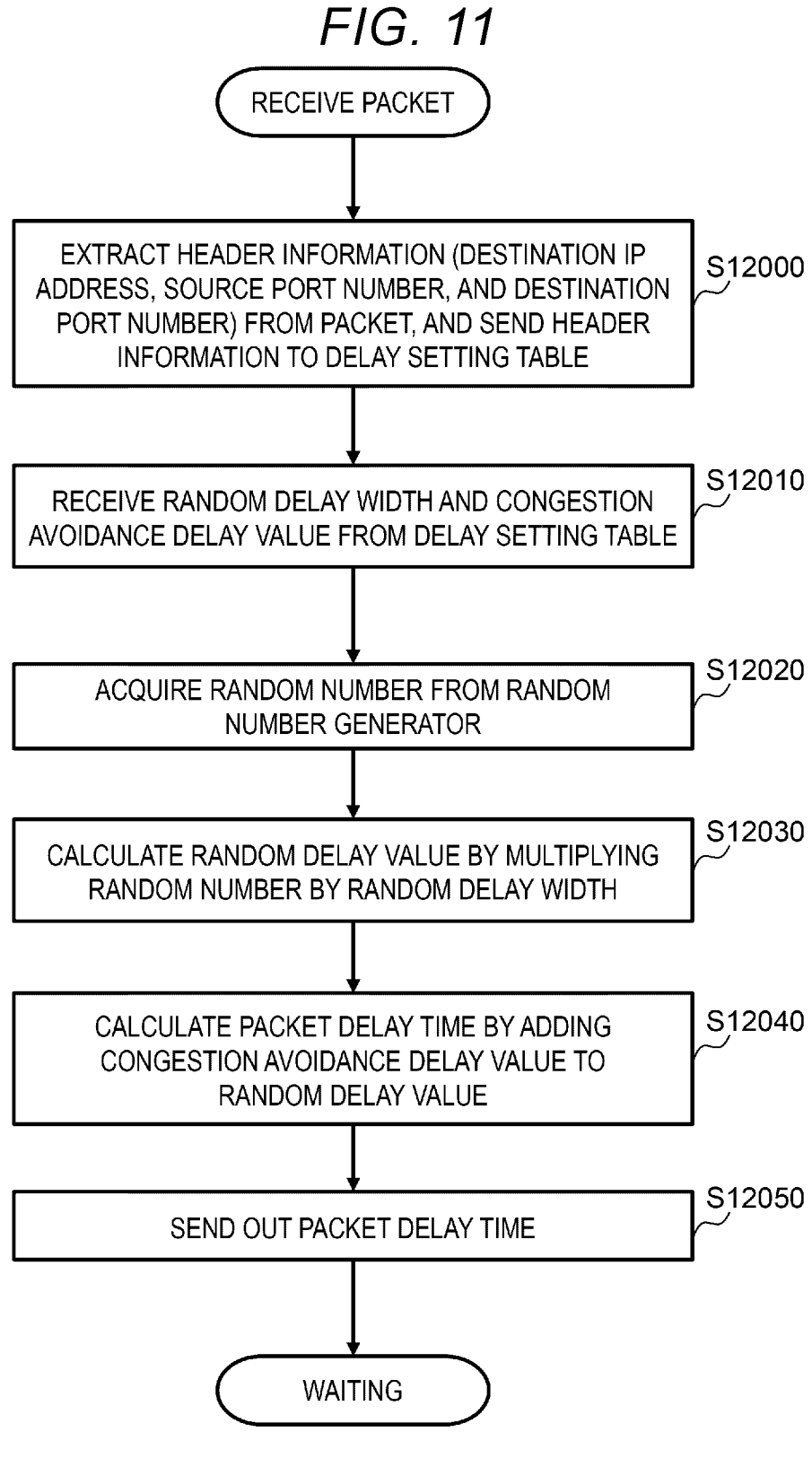
FIG. 11 is an operating flowchart of the delay calculator according to Embodiment 1.

FIG. 11 shows an operating flowchart of the delay calculator 1400. When the packet is received, the delay calculator 1400 sequentially executes processing of steps 12000 to 12050.

Step 12000: The header separator 1110 of the delay calculator 1400 extracts the header information (destination IP address, source port number, and destination port number) from the packet, and sends the header information to the delay setting table 1700. Thereafter, the process proceeds to step 12010.

Step 12010: The delay calculator 1400 receives the random delay width and a congestion avoidance delay value from the delay setting table 1700. Thereafter, the process proceeds to step 12020.

Step 12020: The delay calculator 1400 acquires a random number from the random number generator 1410. Thereafter, the process proceeds to step 12030.

Step 12030: The delay calculator 1400 calculates a random delay value by multiplying the random number by the random delay width. Thereafter, the process proceeds to step 12040.

Step 12040: The delay calculator 1400 calculates a packet delay time by adding the congestion avoidance delay value to the random delay value. Thereafter, the process proceeds to step 12050.

Step 12050: The delay calculator 1400 sends out the packet delay time, and the process returns to the waiting state.

Figure 12:
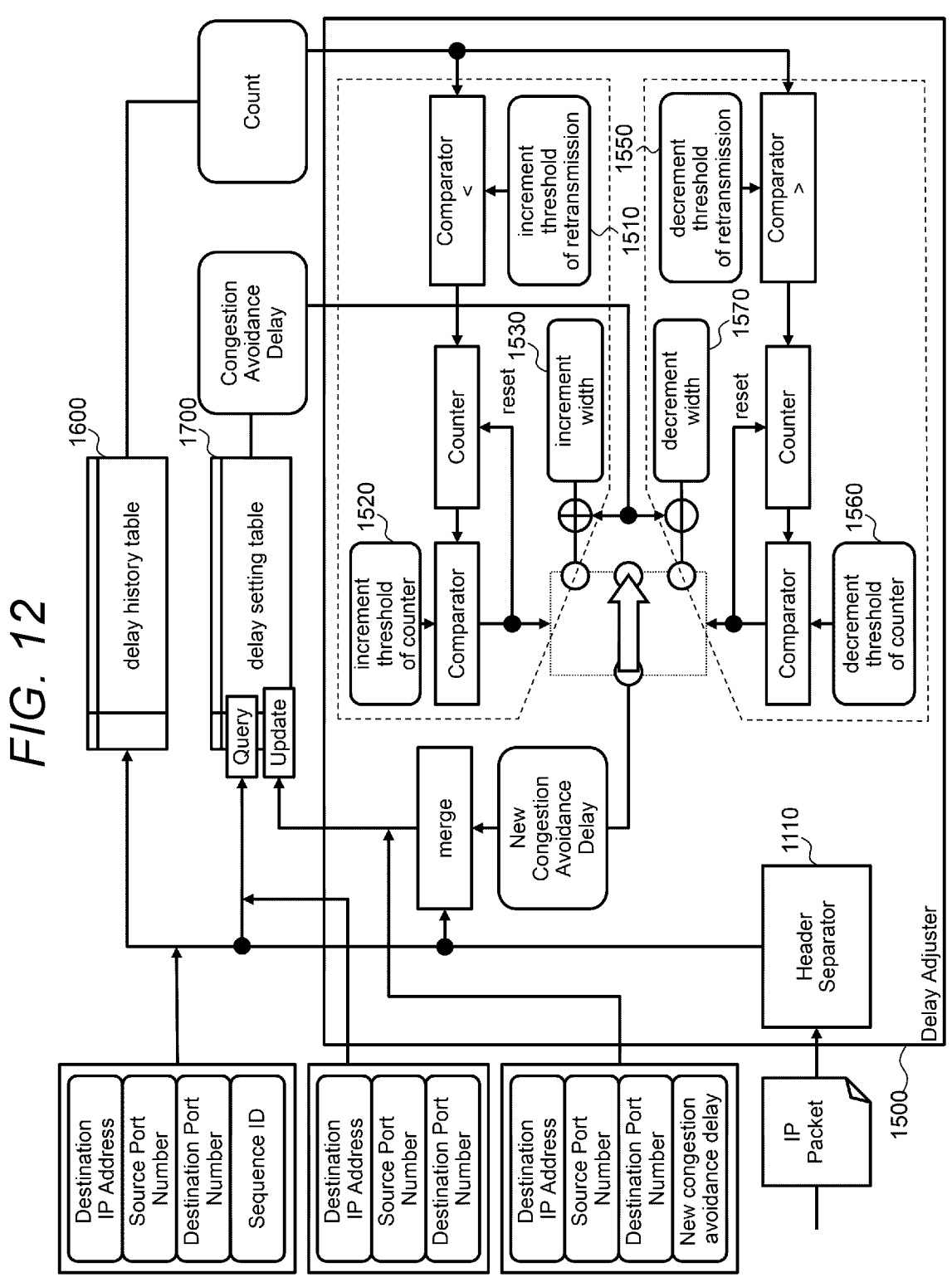
FIG. 12 is a configuration diagram of a delay adjuster according to Embodiment 1.

FIG. 12 shows a configuration of the delay adjuster 1500. The delay adjuster 1500 includes the header separator 1110, a block for adjusting a congestion avoidance time in an increment direction, a block for adjusting a congestion avoidance time in a decrement direction, and a block for issuing a request for updating the delay setting table 1700 by combining the adjusted congestion avoidance time with the header information of the packet. The block for adjusting the congestion avoidance time in the increment direction of the delay adjuster 1500 includes a threshold 1510 for incrementing a congestion avoidance time with respect to the number of times of retransmission of packets, a counter for counting the number of times of establishment of a condition of the number of times of retransmission in the increment direction, a threshold 1520 for determining an actual increment with respect to the condition of the number of times of retransmission in the increment direction, and an increment width 1530. The block for adjusting the congestion avoidance time in the decrement direction of the delay adjuster 1500 includes a threshold 1550 for decreasing a congestion avoidance time with respect to the number of times of retransmission of packets, a counter for counting the number of times of establishment of a condition of the number of times of retransmission in the decrement direction, a threshold 1560 for determining an actual decrement with respect to the condition of the number of times of retransmission in the decrement direction, and a decrement width 1570.

Figure 13:
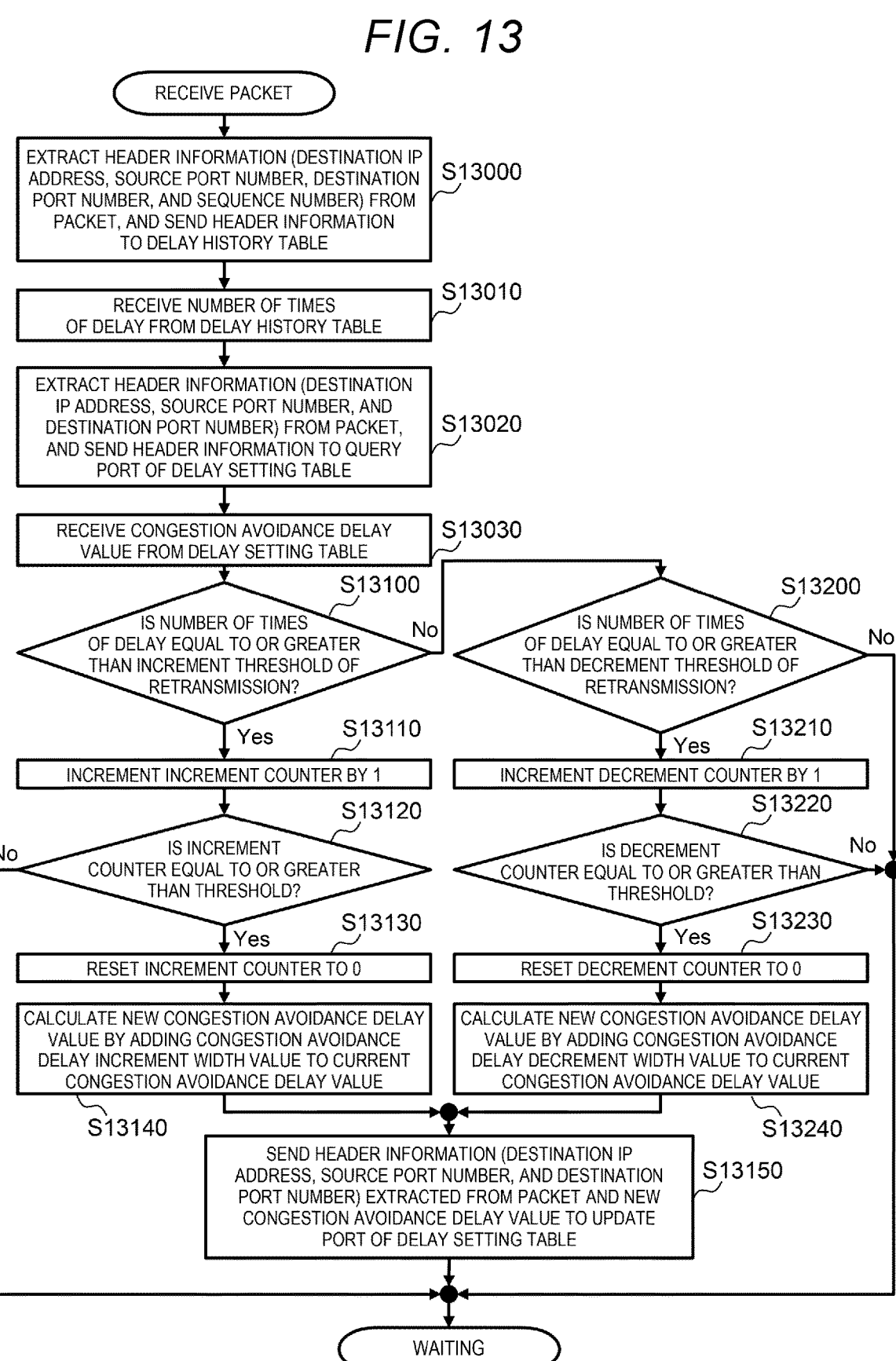
FIG. 13 is an operating flowchart of the delay adjuster according to Embodiment 1.

FIG. 13 shows an operating flowchart of the delay adjuster 1500. When the packet is received, the delay adjuster 1500 sequentially executes processing of steps 13000 to 13240.

Step 13000: The header separator 1110 of the delay adjuster 1500 extracts header information (destination IP address, source port number, destination port number, and sequence number) from the packet, and sends the header information to the delay history table 1600. Thereafter, the process proceeds to step 13010.

Step 13010: The delay adjuster 1500 receives the number of times of delay from the delay history table 1600. Thereafter, the process proceeds to step 13020.

Step 13020: The header separator 1110 of the delay adjuster 1500 extracts header information (destination IP address, source port number, and destination port number) from the packet, and sends the header information to a query port of the delay setting table 1700. Thereafter, the process proceeds to step 13030.

Step 13030: The delay adjuster 1500 receives the congestion avoidance delay value from the delay setting table 1700. Thereafter, the process proceeds to step 13100.

Step 13100: The delay adjuster 1500 determines whether the number of times of delay is equal to or greater than an increment threshold of retransmission. If the number of times of delay is equal to or greater than the increment threshold of retransmission, the process proceeds to step 13110. If the number of times of delay is less than the increment threshold of retransmission, the process proceeds to step 13200.

Step 13110: The delay adjuster 1500 increments the increment counter by 1. Thereafter, the process proceeds to step 13120.

Step 13120: The delay adjuster 1500 determines whether the increment counter is equal to or greater than a threshold. If the increment counter is equal to or greater than the threshold, the process proceeds to step 13130. If the increment counter is less than the threshold, the process returns to the waiting state.

Step 13130: The delay adjuster 1500 resets the increment counter to 0. Thereafter, the process proceeds to step 13140.

Step 13140: The delay adjuster 1500 calculates a new congestion avoidance delay value by adding a congestion avoidance delay increment width value to a current congestion avoidance delay value. Thereafter, the process proceeds to step 13150.

Step 13150: The delay adjuster 1500 sends the header information (destination IP address, source port number, and destination port number) extracted from the packet and the new congestion avoidance delay value to an update port of the delay setting table 1700. Thereafter, the process returns to the waiting state.

Step 13200: The delay adjuster 1500 determines whether the number of times of delay is equal to or greater than a decrement threshold of retransmission. If the number of times of delay is equal to or greater than the decrement threshold of retransmission, the process proceeds to step 13210. If the number of times of delay is less than the decrement threshold of retransmission, the process returns to the waiting state.

Step 13210: The delay adjuster 1500 increments the decrement counter by 1. Thereafter, the process proceeds to step 13220.

Step 13220: The delay adjuster 1500 determines whether the decrement counter is equal to or greater than a threshold. If the decrement counter is equal to or greater than the threshold, the process proceeds to step 13230. If the decrement counter is less than the threshold, the process returns to the waiting state.

Step 13230: The delay adjuster 1500 resets the decrement counter to 0. Thereafter, the process proceeds to step 13240.

Step 13240: The delay adjuster 1500 calculates a new congestion avoidance delay value by adding a congestion avoidance delay decrement width value to a current congestion avoidance delay value. Thereafter, the process proceeds to step 13150.

FIG. 14 shows a configuration of the session state table 1200. The session state table stores a combination of a destination IP address, a source port number, a destination port number, and a last sequence number. The combination of the destination IP address, the source port number, the destination port number, and the sequence number is received from the outside, a row matching the destination IP address, the source port number, and the destination port number is searched for, and when a last sequence number of the matching row is smaller than the received sequence number, the last sequence number is updated. When the last sequence number is larger than the received sequence number, the last sequence number is not updated. Thereafter, the last sequence number of the matching row is output.

Figure 15:
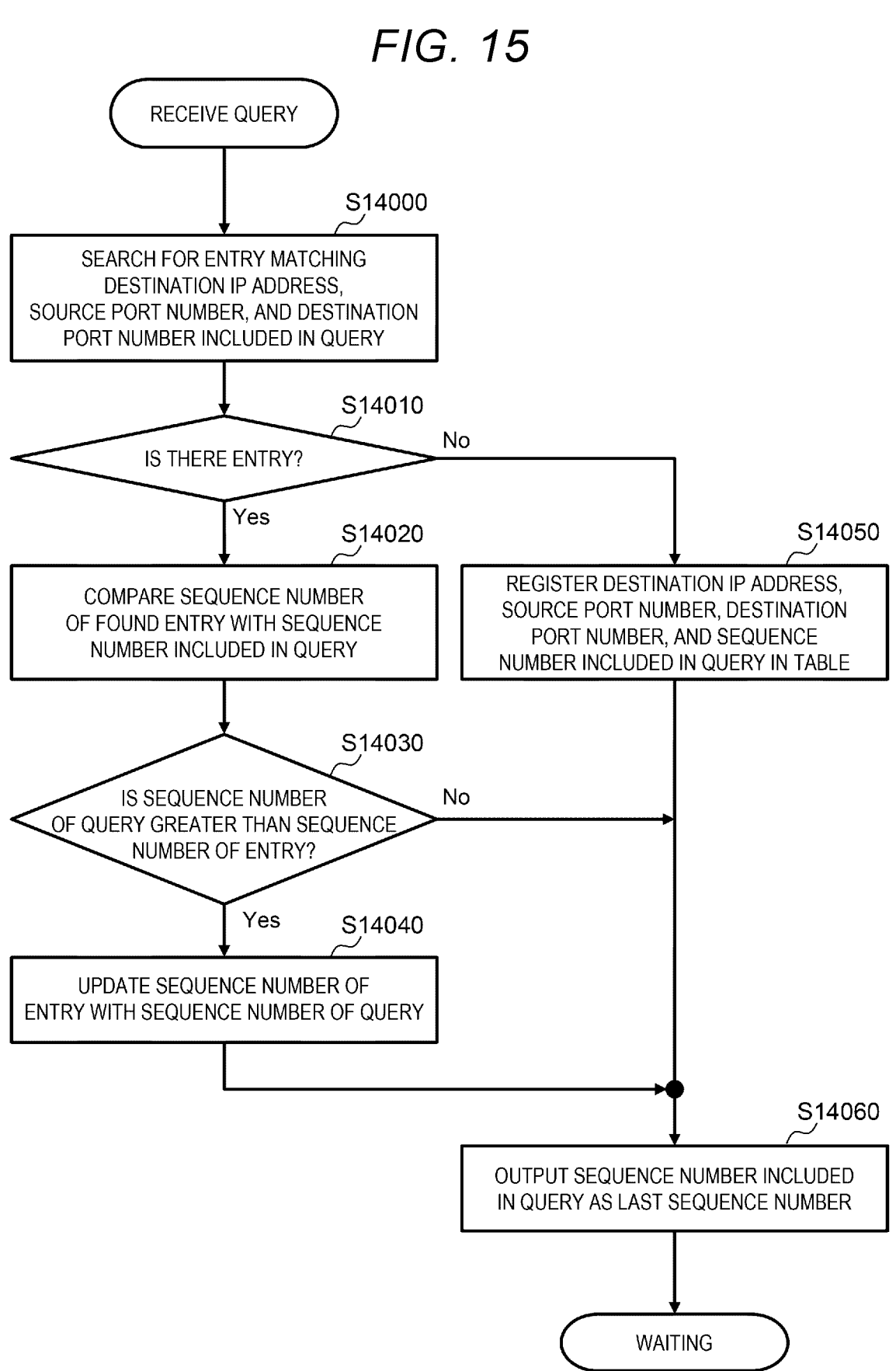
FIG. 15 is an operating flowchart of the session state table.

FIG. 15 shows an operating flowchart of the session state table 1200. When a query is received, the session state table 1200 sequentially executes processing of steps 14000 to 14060.

Step 14000: The session state table 1200 is searched for an entry matching a destination IP address, a source port number, and a destination port number included in the query. Thereafter, the process proceeds to step 14010. Step 14010: The session state table 1200 determines whether there is an entry matching a search condition. If there is an entry matching the search condition, the process proceeds to step 14020. If there is no entry matching the search condition, the process proceeds to step 14050.

Step 14020: The session state table 1200 compares a sequence number of the found entry with the sequence number included in the query. Thereafter, the process proceeds to step 14030.

Step 14030: The session state table 1200 determines whether the sequence number of the query is greater than the sequence number of the entry. If the sequence number of the query is greater than the sequence number of the entry, the process proceeds to step 14040. If the sequence number of the query is equal to or less than the sequence number of the entry, the process proceeds to step 14060.

Step 14040: The session state table 1200 updates the sequence number of the entry with the sequence number of the query. Thereafter, the process proceeds to step 14060.

Step 14050: The session state table 1200 registers the destination address, the source port number, the destination port number, and the sequence number included in the query in the table. Thereafter, the process proceeds to step 14060.

Step 14060: The session state table 1200 outputs the sequence number included in the query as the last sequence number. Thereafter, the process returns to the waiting state.

FIG. 16 shows a configuration of the delay setting table 1700. The delay setting table 1700 stores a destination IP address, a source port number, a destination port number, a congestion avoidance delay time, and a random delay width. When the destination IP address, the source port number, and the destination port number are received from the query port from the outside, information matching the destination IP address, the source port number, and the destination port number is searched for from the stored information, and a congestion avoidance delay time and a random delay width of the matching row are output. If no matching row is found, a predetermined congestion avoidance delay time and random delay width are output. When a combination of a destination IP address, a source port number, a destination port number, and a congestion avoidance delay time is received from the update port from the outside, the information matching the destination IP address, the source port number, and the destination port number is searched for from the stored information, and the congestion avoidance delay time of the matching row is updated. If no matching row is found, a new row is added in combination with the predetermined random delay width.

Figure 17:
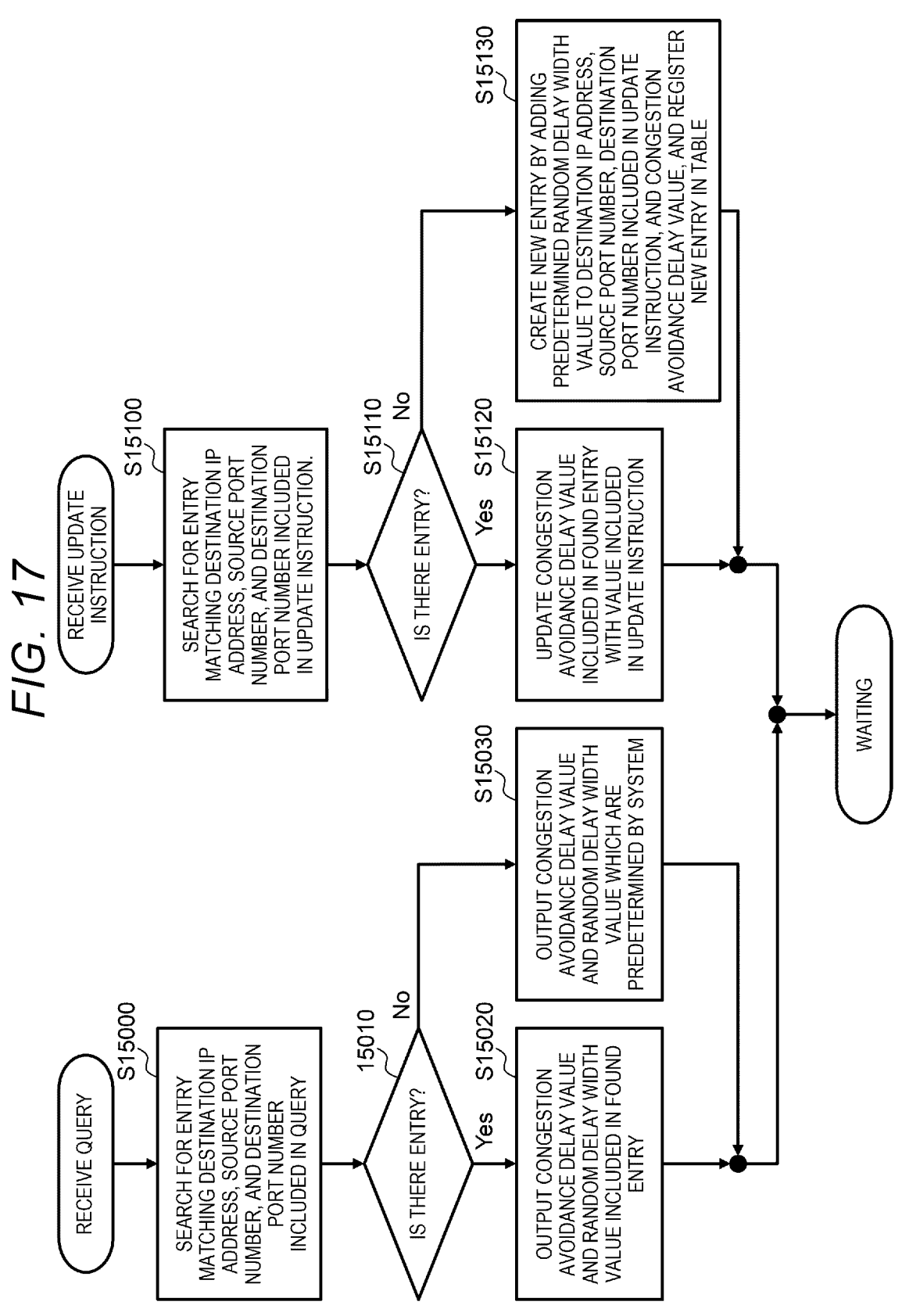
FIG. 17 is an operating flowchart of the delay setting table.

FIG. 17 shows an operating flowchart of the delay setting table 1700. When a query is received, the delay setting table 1700 sequentially executes processing of steps 15000 to 15030. When an update instruction is received, the delay setting table 1700 sequentially executes processing of steps 15100 to 15130.

Step 15000: The delay setting table 1700 is searched for an entry matching a destination IP address, a source port number, and a destination port number included in the query. Thereafter, the process proceeds to step 15010.

Step 15010: The delay setting table 1700 determines whether there is an entry matching a search condition. If there is an entry matching the search condition, the process proceeds to step 15020. If there is no entry matching the search condition, the process proceeds to step 15030.

Step 15020: The delay setting table 1700 outputs a congestion avoidance delay value and a random delay width value included in the found entry. Thereafter, the process returns to the waiting state.

Step 15030: The delay setting table 1700 outputs a congestion avoidance delay value and a random delay width value which are predetermined by the system. Thereafter, the process returns to the waiting state.

Step 15100: The delay setting table 1700 is searched for an entry matching a destination IP address, a source port number, and a destination port number included in the update instruction. Thereafter, the process proceeds to step 15110.

Step 15110: The delay setting table 1700 determines whether there is an entry matching a search condition. If there is an entry matching the search condition, the process proceeds to step 15120. If there is no entry matching the search condition, the process proceeds to step 15130.

Step 15120: The delay setting table 1700 updates the congestion avoidance delay value included in the found entry with a value included in the update instruction. Thereafter, the process returns to the waiting state.

Step 15130: The delay setting table 1700 creates a new entry by adding the predetermined random delay width value to the destination IP address, the source port number, and the destination port number included in the update instruction, and the congestion avoidance delay value, and registers the new entry in the table. Thereafter, the process returns to the waiting state.

FIG. 18 shows a configuration of the delay history table 1600. The delay history table 1600 stores a plurality of rows each including a destination IP address, a source port number, a destination port number, a sequence number, and the number of times of retransmission counter. When the destination IP address, the source port number, the destination port number, and the sequence number are received from the outside, a row matching the received information is searched for, a value of the number of times of retransmission counter of the matching row is incremented by 1, and the incremented value is output. When there is no matching row, a row in which the number of times of retransmission counter is set to 1 is newly added to the received information.

FIG. 19 shows an operating flowchart of the delay history table 1600. When a query is received, the delay history table 1600 starts processing from step 16000.

Step 16000: The delay history table 1600 is searched for an entry matching a destination IP address, a source port number, a destination port number, and a sequence number included in the query. Thereafter, the process proceeds to step 16010.

Step 16010: The delay history table 1600 determines whether there is an entry matching a search condition. If there is an entry matching the search condition, the process proceeds to step 16020. If there is no entry matching the search condition, the process proceeds to step 16100.

Step 16020: The delay history table 1600 increments the number of times of retransmission (count) of the found entry by 1, and outputs the incremented number of times as the number of times of retransmission. Thereafter, the process returns to the waiting state.

Step 16100: The delay history table 1600 creates an entry by setting the number of times of retransmission to 1 based on the destination IP address, the source port number, the destination port number, and the sequence number included in the query, and registers the entry in the table. Thereafter, the process proceeds to step 16110.

Step 16110: The delay history table 1600 outputs 1 as the number of times of retransmission. Thereafter, the process returns to the waiting state.

Figure 20:
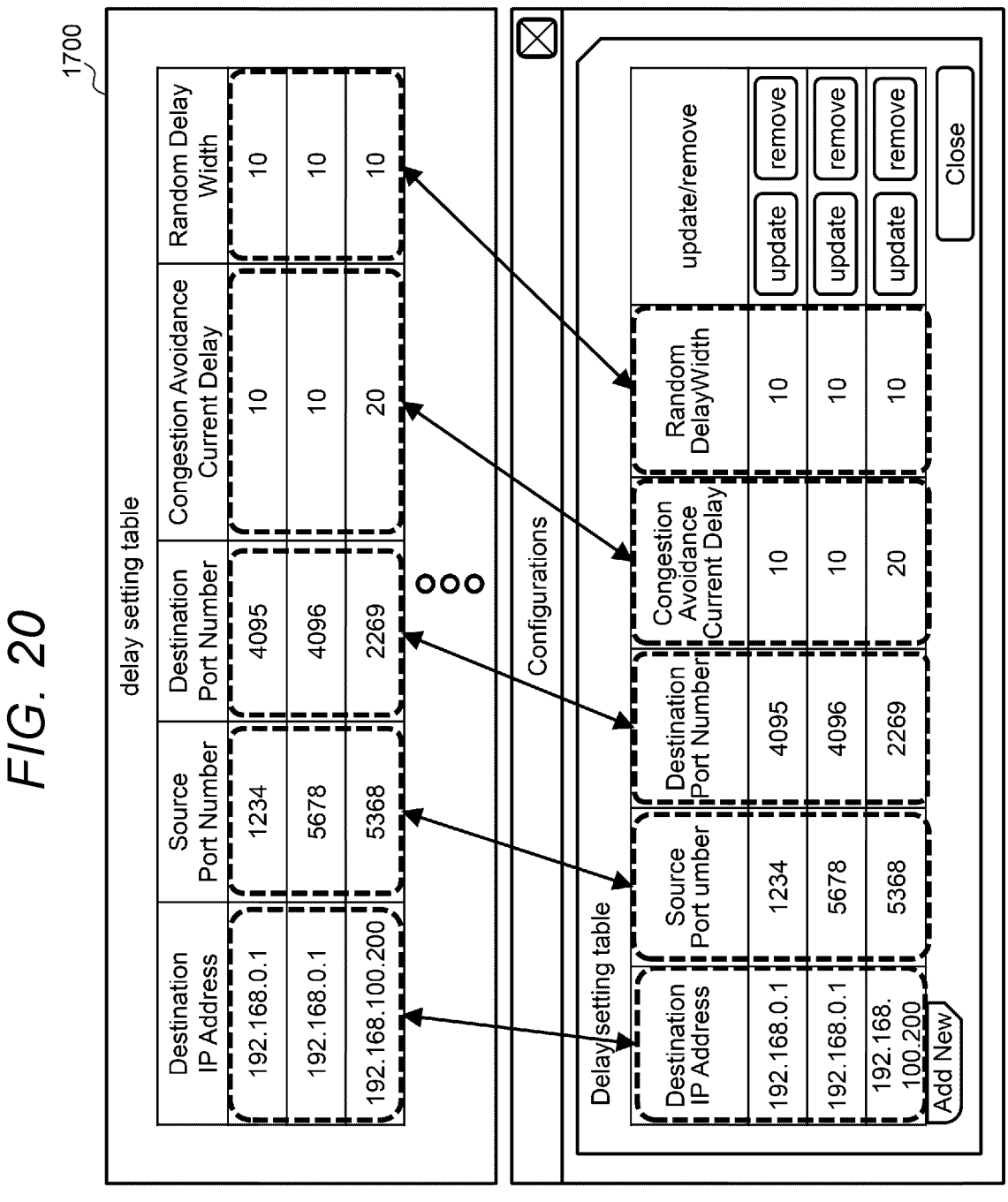
FIG. 20 is a setting screen example of the delay setting table.

FIG. 20 shows a setting screen example of the delay setting table 1700. The congestion avoidance delay time and the random delay width for each destination can be changed from, for example, a graphical user interface (GUI). In addition, when there is no destination row, a destination row can be newly set. Although the congestion avoidance delay time is automatically adjusted, the setting can also be changed from the outside through such an interface. Although an example of the GUI is shown in this example, the setting may be changed through an interface such as a commandline user interface (CUI) or a representational state transfer (REST) API.

Figure 21:
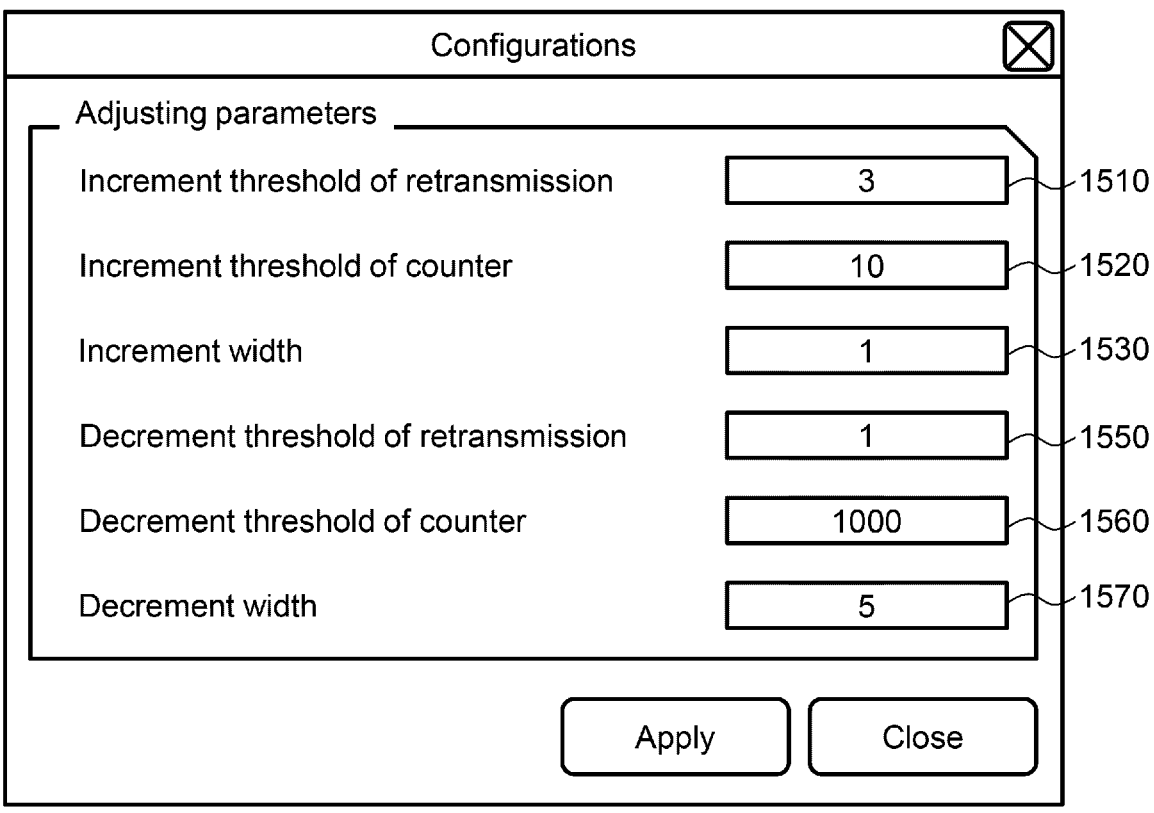
FIG. 21 is a setting screen example of a delay adjusting mechanism.

FIG. 21 shows a setting screen example of the delay adjuster 1500. The threshold 1510 for incrementing the congestion avoidance time with respect to the number of times of retransmission of packets, the threshold 1520 for determining the actual increment with respect to the condition of the number of times of retransmission in the increment direction, and the increment width 1530 can be set for the block for adjusting the congestion avoidance time in the increment direction. The threshold 1550 for decrementing the congestion avoidance time with respect to the number of times of retransmission of packets, the threshold 1560 for determining the actual increment with respect to the condition of the number of times of retransmission in the decrement direction, and the decrement width 1570 can be set for the block for adjusting the congestion avoidance time in the decrement direction. Although an example of the GUI is shown in this example, the setting may be changed through an interface such as the CUI or the REST API.

Embodiment 2

Embodiment in Which Congestion Avoidance Time is Acquired From Network Switch

Embodiment 2 shows a case in which the congestion avoidance time is adjusted by obtaining an average congestion time from the network 400 instead of an automatic adjustment based on the observation of the retransmission execution state shown in Embodiment 1.

Figure 22:
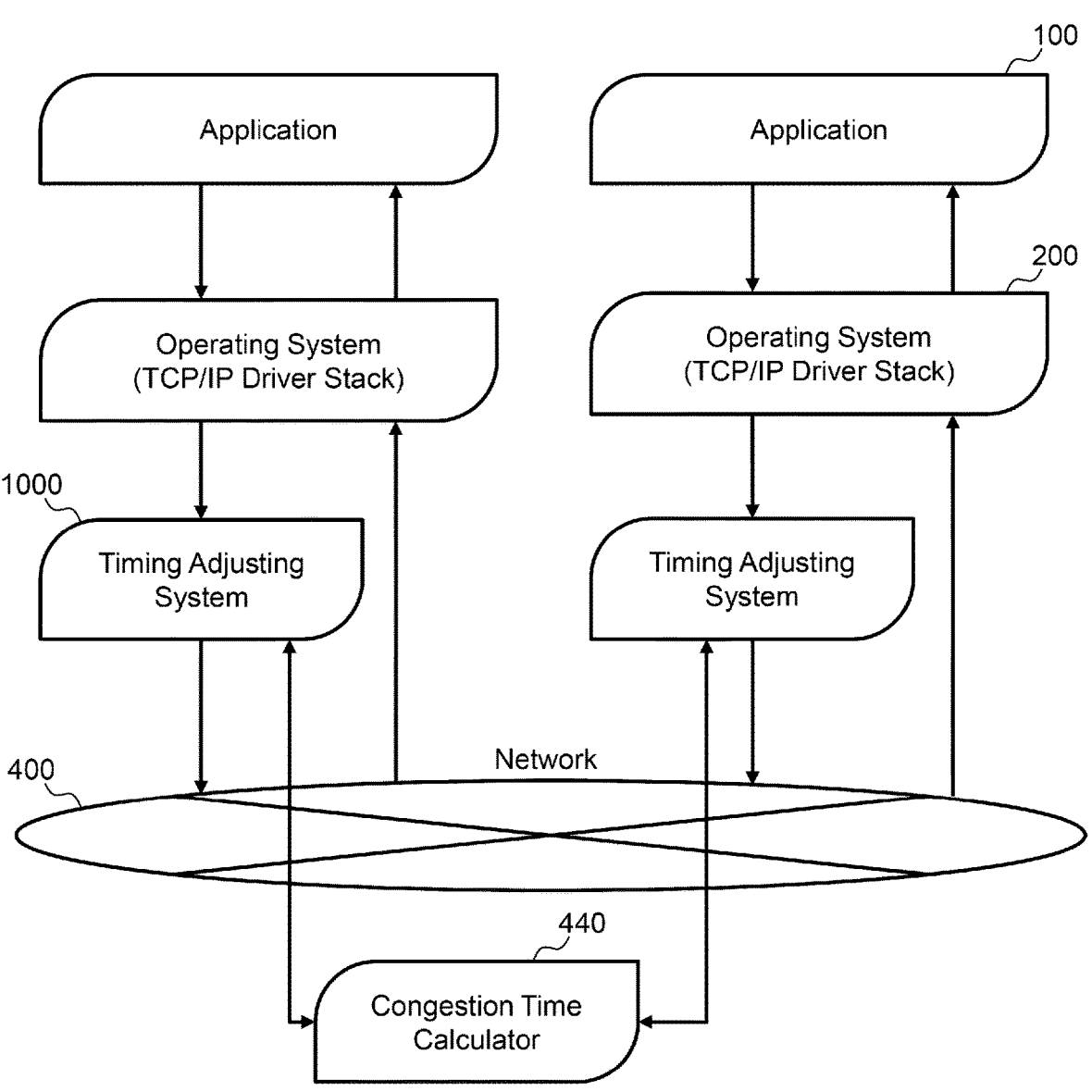
FIG. 22 is a system conceptual diagram according to Embodiment 2.

FIG. 22 shows an outline of a flow of a packet including data according to Embodiment 2. A difference from Embodiment 1 is that a congestion time calculator 440, which is a mechanism for calculating an average congestion time, is added to the network 400, the average congestion time observed in the network 400 is notified according to a query from the timing adjusting system 1000, and the timing adjusting system 1000 delays packet transmission based on the notification.

Figure 23:
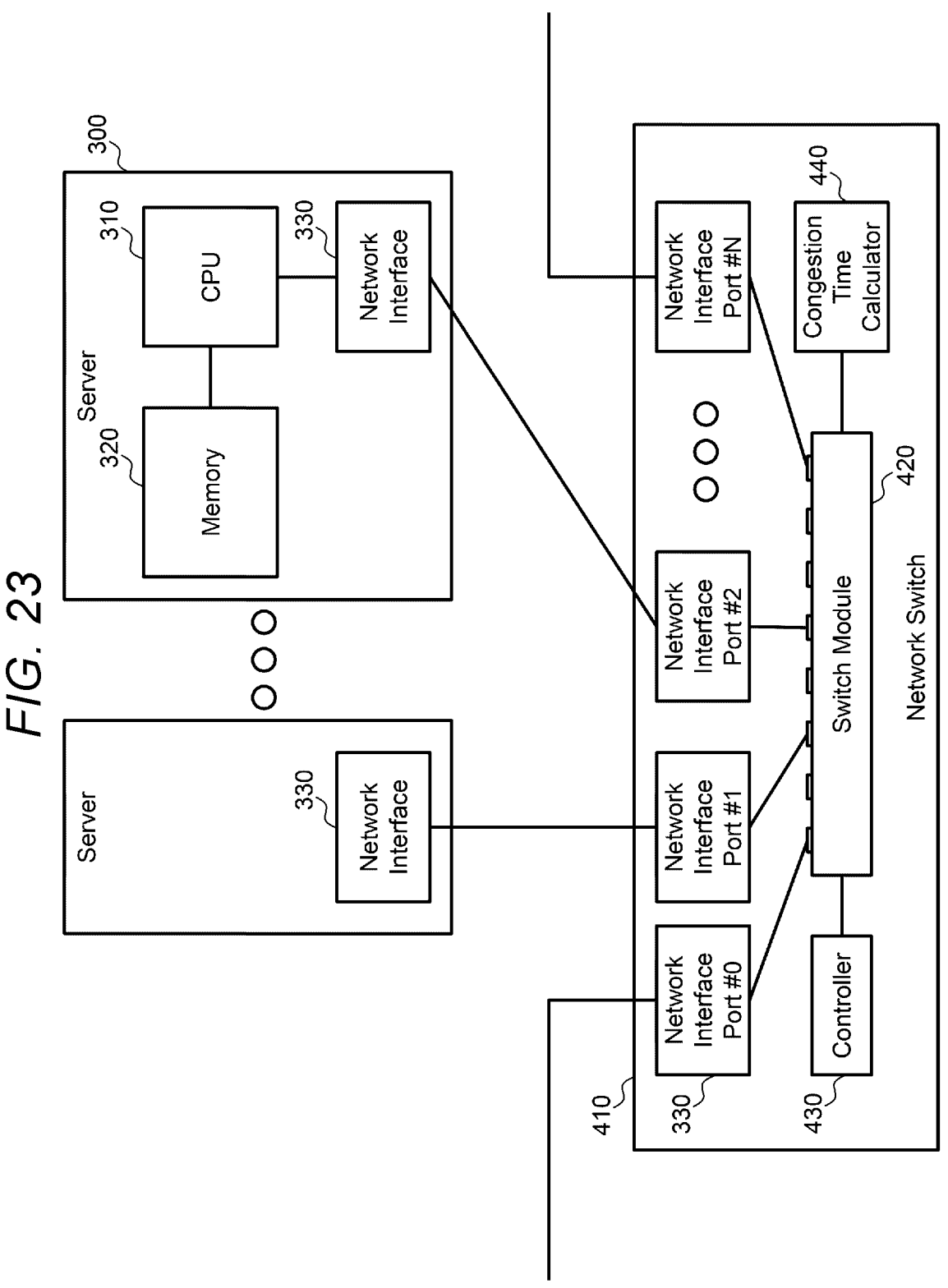
FIG. 23 is a hardware configuration diagram according to Embodiment 2.

FIG. 23 is a schematic configuration diagram of hardware according to Embodiment 2. The congestion time calculator 440 is added to the network switch 410 as a difference from Embodiment 1. The congestion time calculator 440 monitors an operating status of the network switch 410, measures a congestion time for each network interface 330, and calculates an average congestion time by averaging all the congestion times.

Figure 24:
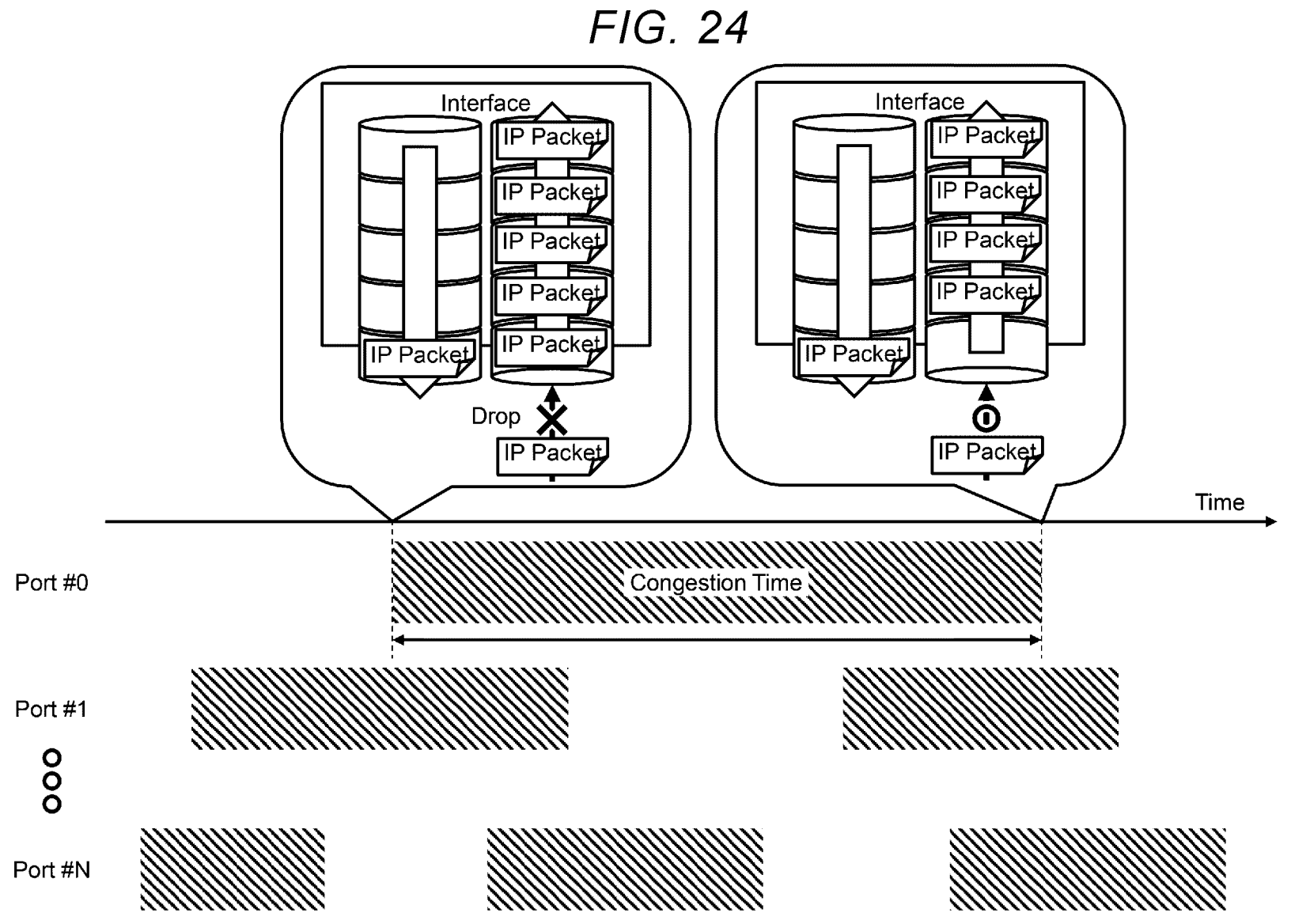

FIG. 24 is a schematic diagram of congestion time measurement. When a packet arrives at a certain network interface 330, a time from a time point when a transmission buffer of a network interface becomes full and a packet is lost to a time point when the transmission buffer becomes empty is defined as a congestion time. Since a different congestion time is measured for each transmission and reception port of the network interface, it is possible to calculate an average value of the congestion times of all the switches, and respond to a query from the timing adjusting system.

Figure 25:
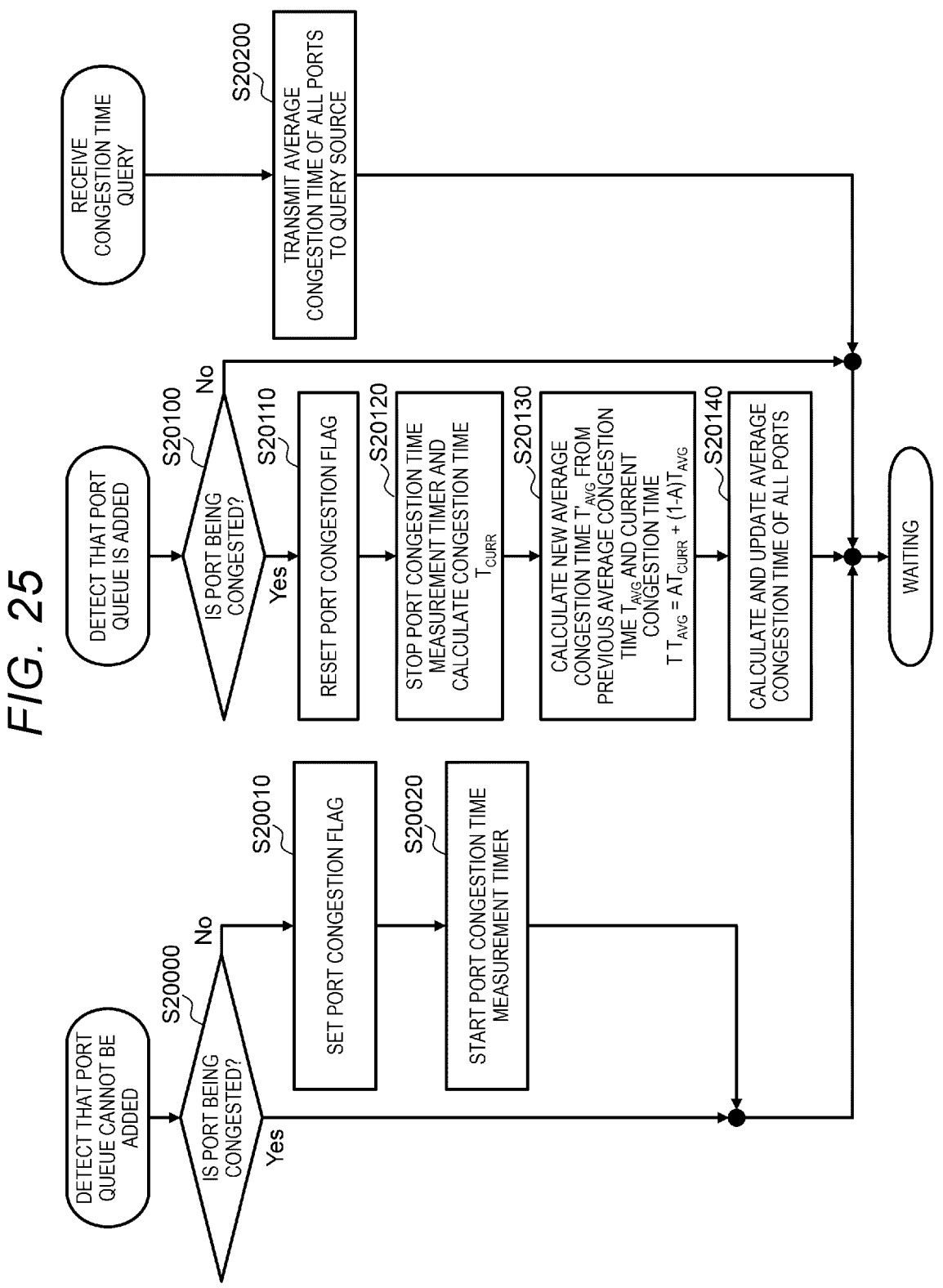
FIG. 25 is a configuration diagram of a congestion time calculator.

FIG. 25 is an operating flowchart of the congestion time calculator 440.

When it is detected that a port queue cannot be added, the congestion time calculator 440 starts processing from step 20000.

Step 20000: The congestion time calculator 440 determines whether the port is being congested with reference to a port congestion flag. If the port is being congested, the process returns to a waiting state. If the port is not being congested, the process proceeds to step 20010.

Step 20010: The congestion time calculator 440 sets the port congestion flag, and the process proceeds to step 20020.

Step 20020: The congestion time calculator 440 starts a port congestion time measurement timer. Thereafter, the process returns to the waiting state.

When the congestion time calculator 440 detects that the port queue is added, the process starts processing from step 20100.

Step 20100: The congestion time calculator 440 determines whether the port is being congested with reference to the port congestion flag. If the port is being congested, the process proceeds to step 20110. If the port is not being congested, the process returns to the waiting state.

Step 20110: The congestion time calculator 440 resets the port congestion flag, and the process proceeds to step 20120.

Step 20120: The congestion time calculator 440 stops the port congestion time measurement timer and calculates a congestion time $T_{curr}$. Thereafter, the process proceeds to step 20130.

Step 20130: The congestion time calculator 440 calculates a new average congestion time $T'_{avg}$ from a previous average congestion time Tavg and a current congestion time T.

$$T_{avg} = \alpha T_{curr} + (1 - \alpha)T_{avg}$$

Thereafter, the process proceeds to step 20140.

Step 20140: The congestion time calculator 440 calculates and updates an average congestion time of all the ports. Thereafter, the process returns to the waiting state.

When a congestion time query is received, the congestion time calculator 440 starts processing of step 20200.

Step 20200: The average congestion time of all the ports is transmitted to a query source. Thereafter, the process returns to the waiting state.

Figure 26:
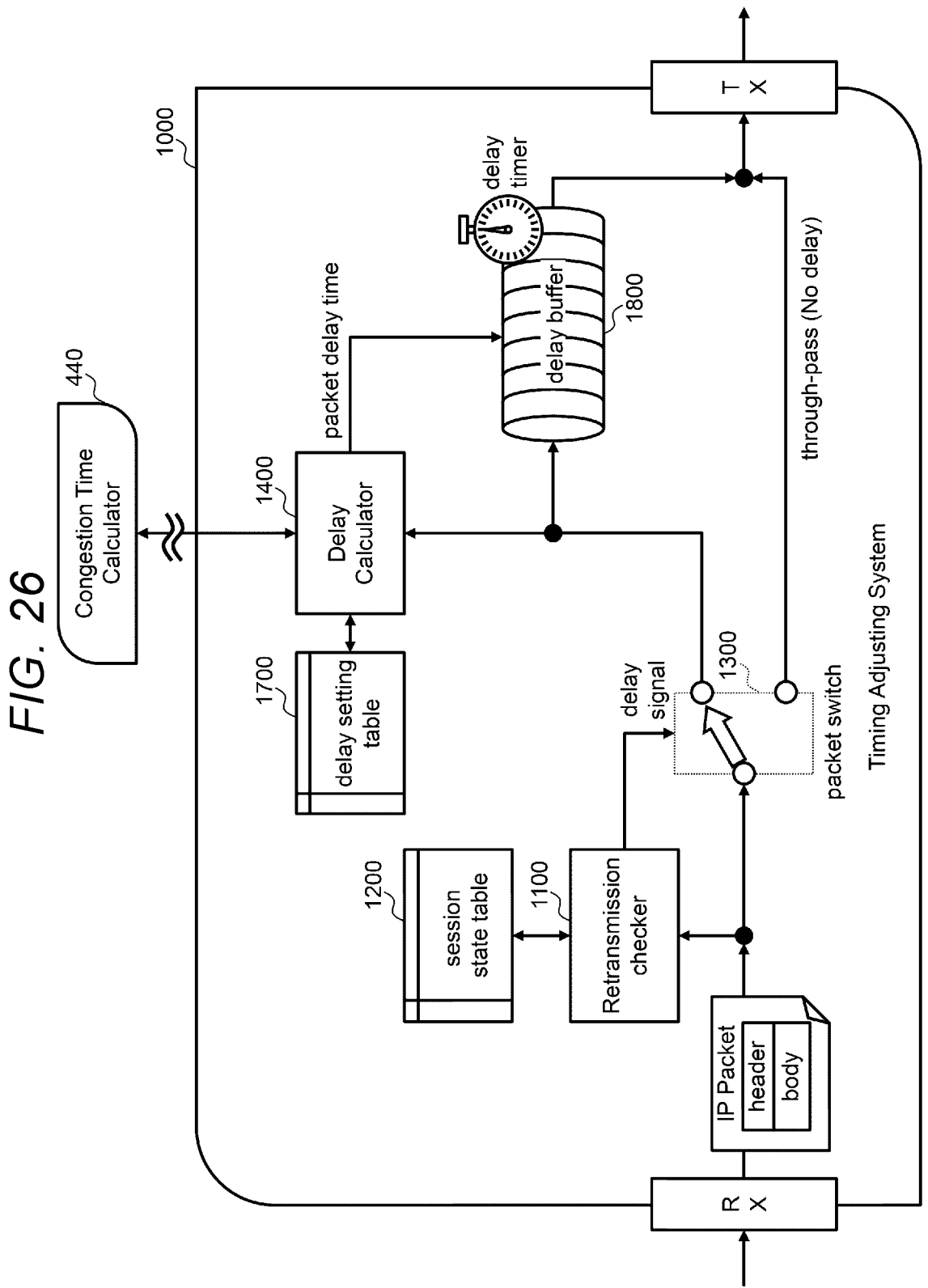
FIG. 26 is an operating flowchart of the congestion time calculator.

FIG. 26 is a configuration diagram of the timing adjusting system 1000 according to Embodiment 2. A difference from Embodiment 1 is that the delay adjuster 1500 is not present and the delay calculator 1400 is changed to query the congestion time calculator 440 about the congestion avoidance time. Operations of other components are the same as those in Embodiment 1. In addition, the operating flowchart of the timing adjusting system 1000 is the same as that of Embodiment 1 because only an internal operation of the delay calculator 1400 is changed.

Figure 27:
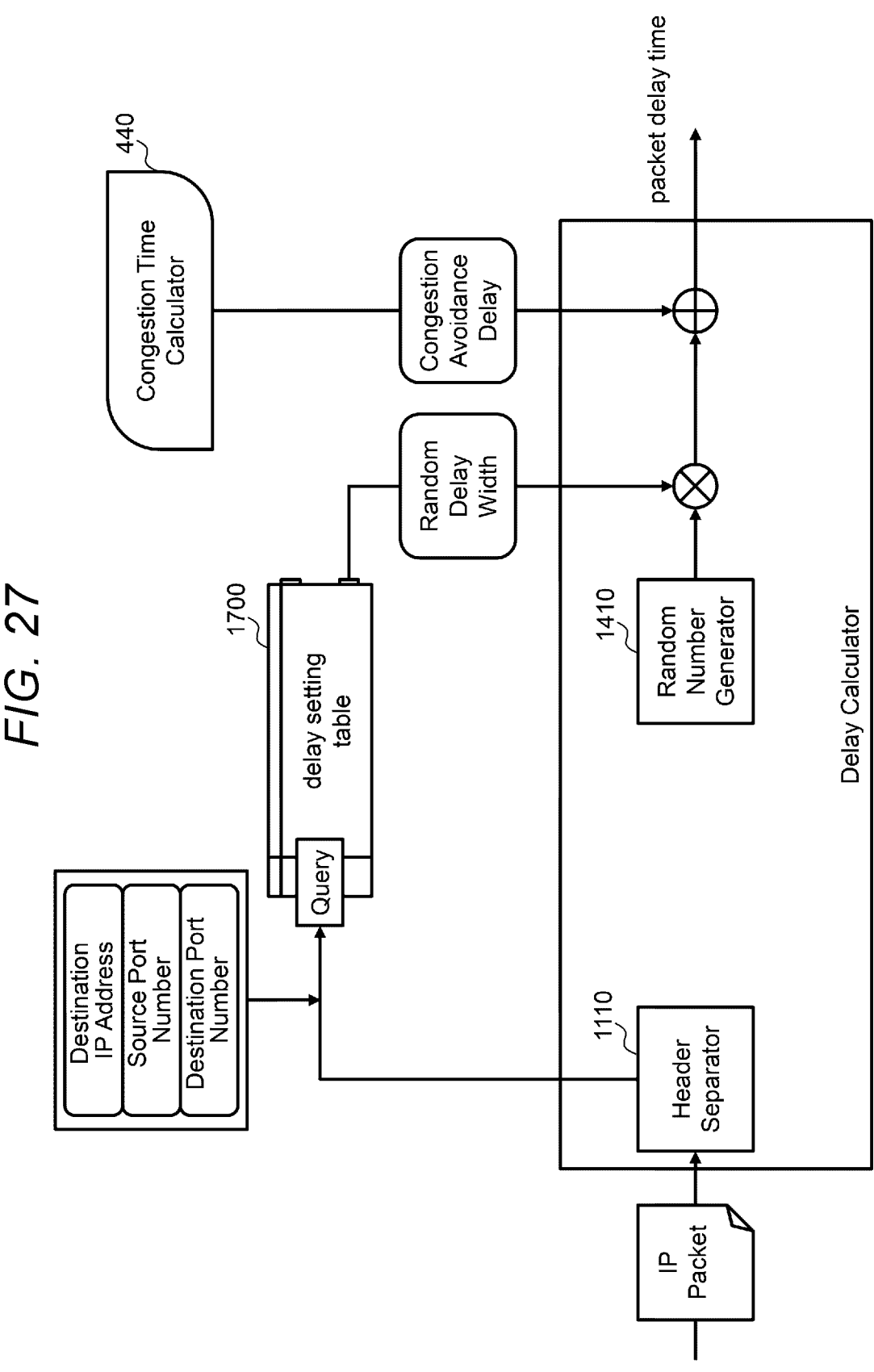
FIG. 27 is a configuration diagram of a delay calculator according to Embodiment 2.

FIG. 27 is a configuration diagram of the delay calculator 1400 according to Embodiment 2. A difference from Embodiment 1 is that a congestion avoidance time of a parameter obtained from the delay setting table 1700 in Embodiment 1 is changed to be obtained from the congestion time calculator 440 in Embodiment 2. Other operations are the same as those of Embodiment 1.

Figure 28:
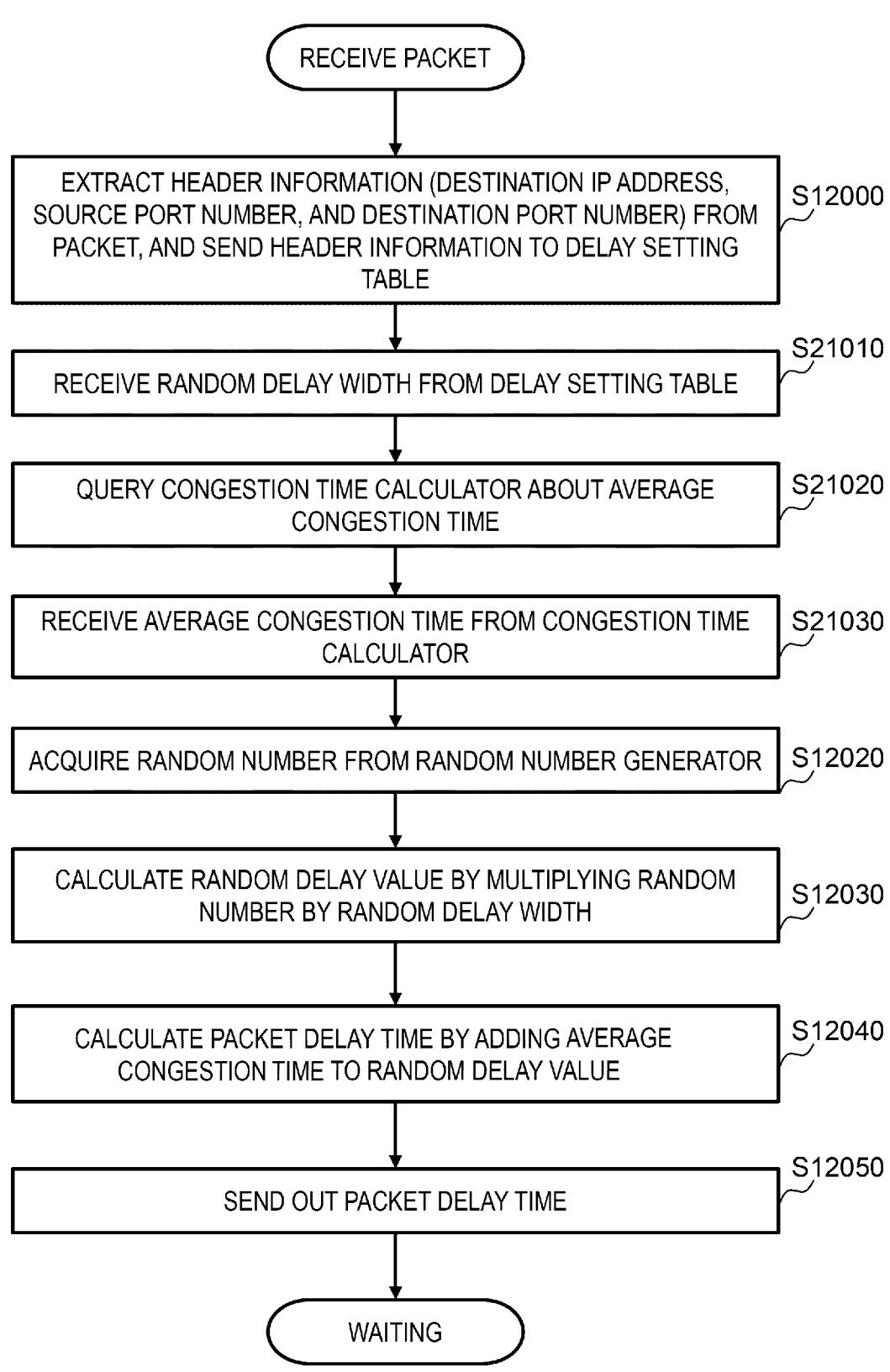
FIG. 28 is an operating flowchart of the delay calculator according to Embodiment 2.

FIG. 28 is an operating flowchart of the delay calculator 1400 according to Embodiment 2. When a packet is received, the delay calculator 1400 according to the embodiment starts processing from step 12000.

Step 12000: The header separator 1110 of the delay calculator 1400 extracts header information (destination IP address, source port number, and destination port number) from the packet, and sends the header information to the delay setting table 1700. Thereafter, the process proceeds to step 21010.

Step 21010: The delay calculator 1400 receives a random delay width from the delay setting table 1700. Thereafter, the process proceeds to step 21020.

Step 21020: The delay calculator 1400 queries the congestion time calculator 440 about an average congestion time. Thereafter, the process proceeds to step 21030.

Step 21030: The delay calculator 1400 receives the average congestion time from the congestion time calculator 440. Thereafter, the process proceeds to step 12020. The subsequent processing is the same as that of Embodiment 1, and thus the description thereof will be omitted.

Embodiment 3

Embodiment in Which Predetermined Value of Congestion Avoidance Time are Statistically Calculated Embodiment 3 shows a configuration in which a predetermined value before automatic adjustment of a congestion avoidance time is calculated from a previous congestion avoidance time setting state and a statistical value of the number of times of occurrence of continuous retransmission at that time. In Embodiment 1, the predetermined value is a fixed value regardless of a destination of a packet, but in the present embodiment, the predetermined value of the congestion avoidance time sufficient to reduce the occurrence of the continuous retransmission is calculated from past statistical information for each destination to reduce the occurrence of the continuous retransmission at an early stage.

Figure 29:
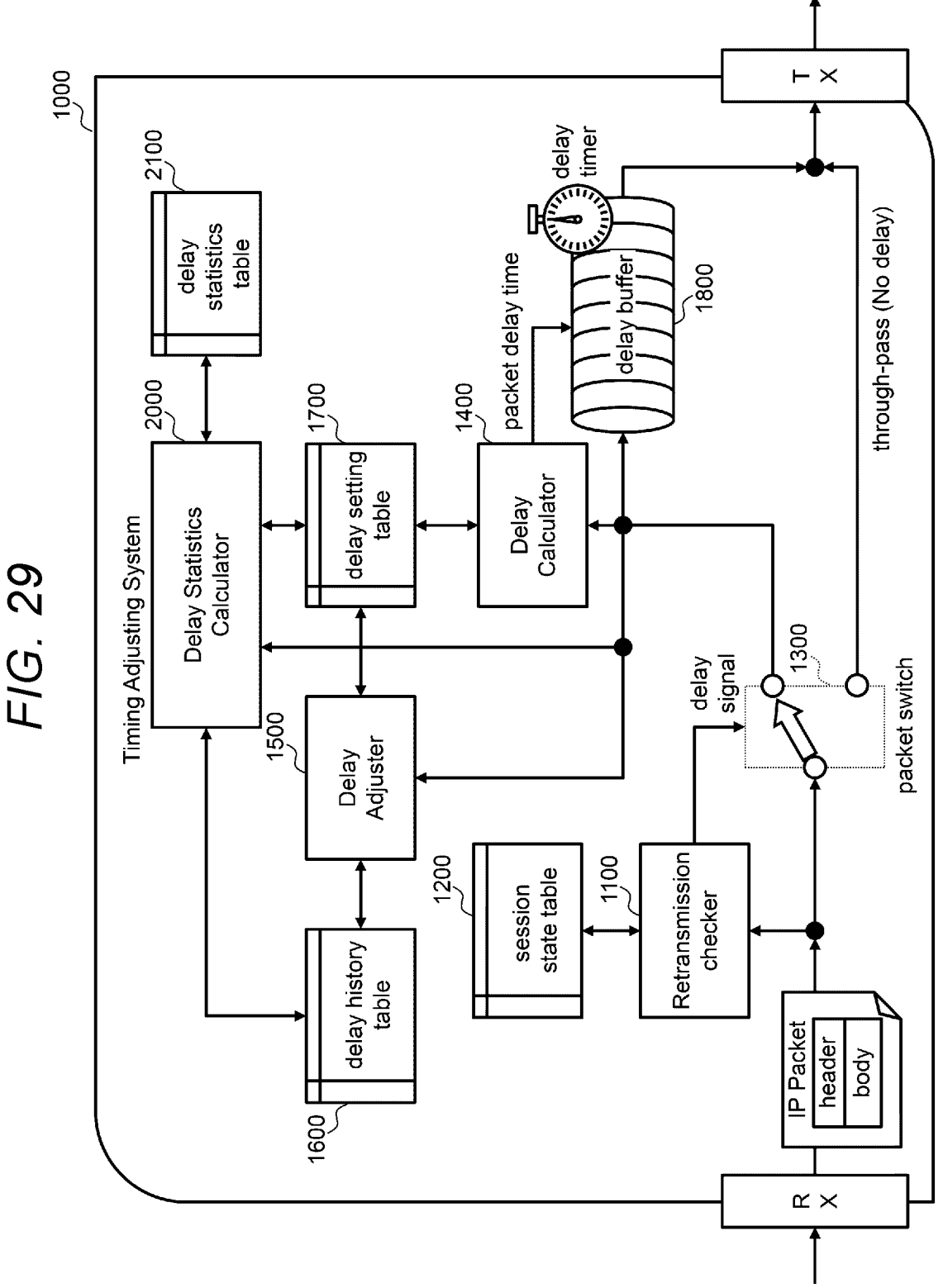
FIG. 29 is a configuration diagram of a delay adjuster according to Embodiment 3.

FIG. 29 is a configuration diagram of the timing adjusting system 1000 according to Embodiment 3. A delay statistics calculator 2000 and a delay statistics table 2100 are added as a difference from Embodiment 1. The delay statistics calculator 2000 records a relation between a congestion avoidance delay time and a maximum number of times of retransmission set for a certain packet in the delay statistics table 2100. The delay statistics calculator 2000 receives a query about a predetermined congestion avoidance time from the delay setting table 1700, calculates a minimum congestion avoidance time at which the maximum number of times of retransmission is the smallest from the record of the delay statistics table 2100, and returns the minimum congestion avoidance time to the delay setting table 1700.

Figure 30:
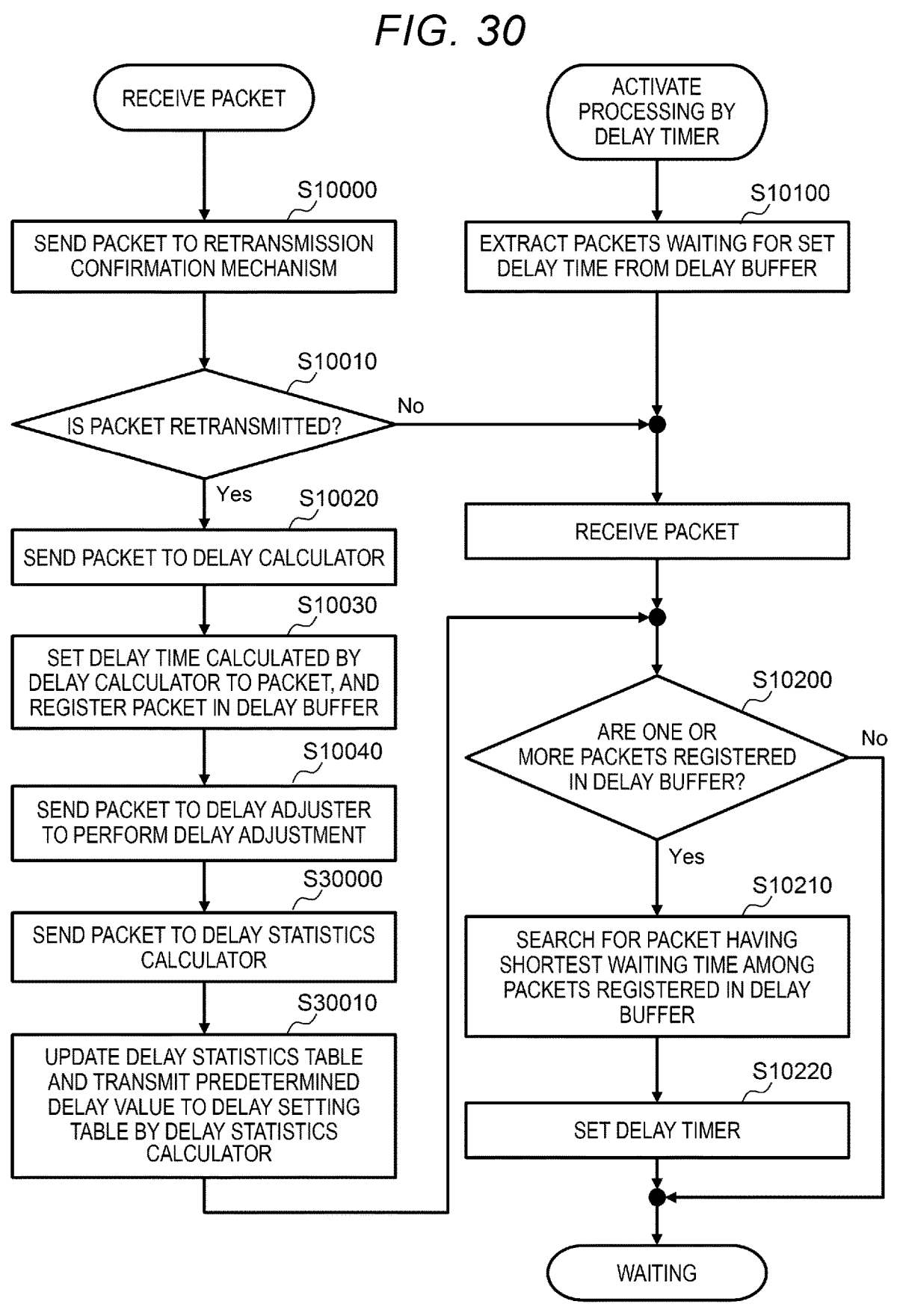

FIG. 30 is an operating flowchart of the timing adjusting system 1000 according to Embodiment 3. The timing adjusting system 1000 of Embodiment 3 is different from that of Embodiment 1 in that step 30000 and step 30010 are executed after step 10040, and then the process proceeds to step 10200. The other configurations are the same as those of Embodiment 1, and thus the description thereof will be omitted.

Step 30000: The timing adjusting system 1000 sends a packet to the delay statistics calculator 2000. Thereafter, the process proceeds to step 30010.

Step 30010: The delay statistics calculator 2000 updates the delay statistics table 2100 and transmits a predetermined delay value to the delay setting table 1700. Thereafter, the process proceeds to step 10200.

Figure 31:
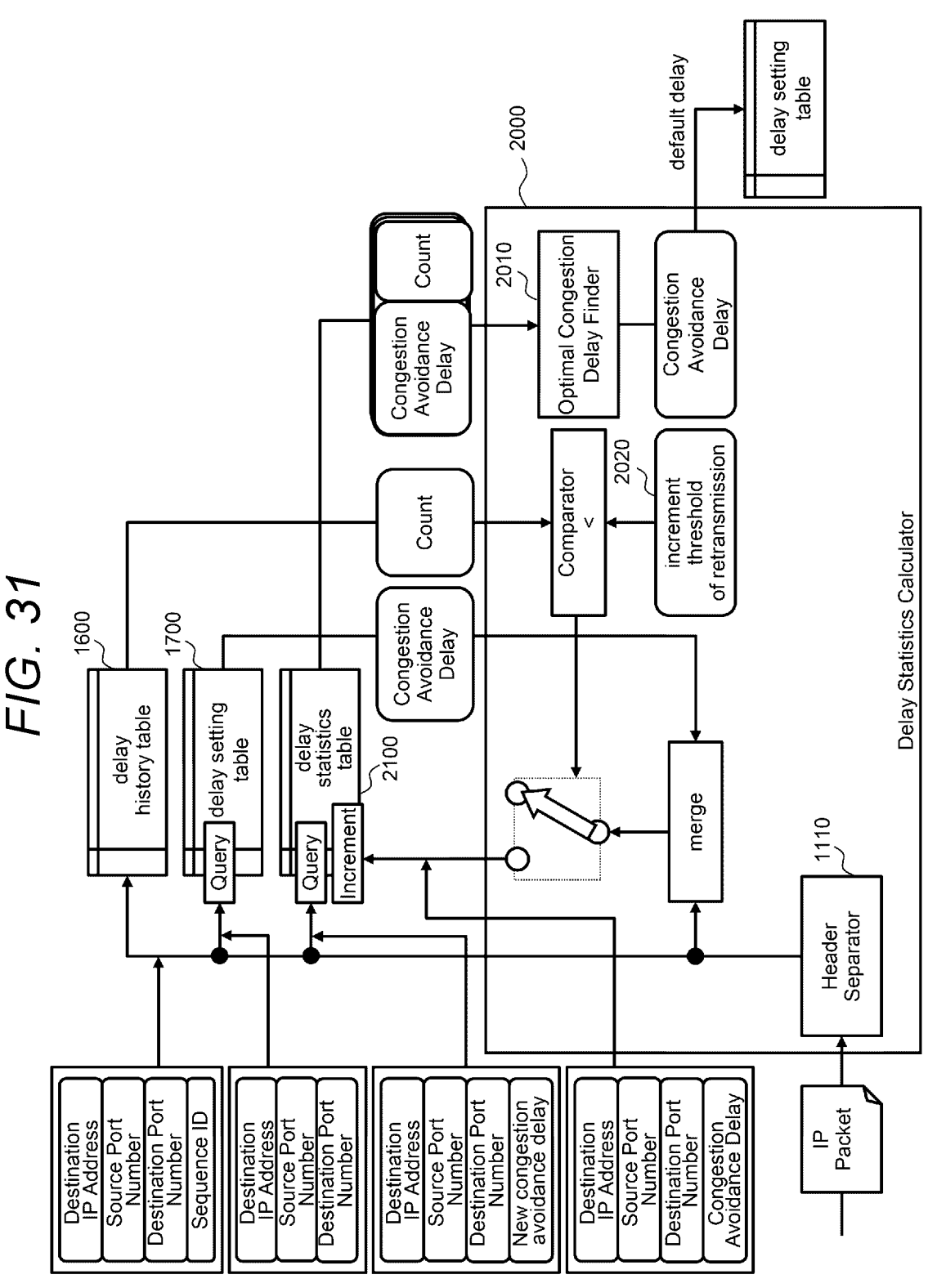
FIG. 31 is a configuration diagram of a delay statistics calculator.

FIG. 31 is a configuration diagram of the delay statistics calculator 2000 according to Embodiment 3. The delay statistics calculator 2000 includes the header separator 1110, a delay statistics table update block, and a predetermined congestion delay time calculation unit 2010. The delay statistics table update block includes a threshold 2020 for the number of times of retransmission of a packet, a comparator that compares the threshold with the number of times of retransmission of the packet, and a merge that combines a congestion avoidance delay time with a destination IP address, a source port number, and a destination port number included in the packet based on a comparison result. The predetermined congestion delay time calculation unit 2010 receives a plurality of sets of the congestion avoidance delay time and the number of times of occurrence of retransmission obtained by being sent to a query port of the delay statistics table 2100 using the destination IP address, the source port number, and the destination port number extracted from the packet, selects a combination in which the number of times of occurrence of retransmission is the minimum and the congestion avoidance delay time is the minimum from among the sets, and outputs the congestion avoidance delay time to the delay setting table 1700 as a predetermined congestion avoidance delay time.

Figure 32:
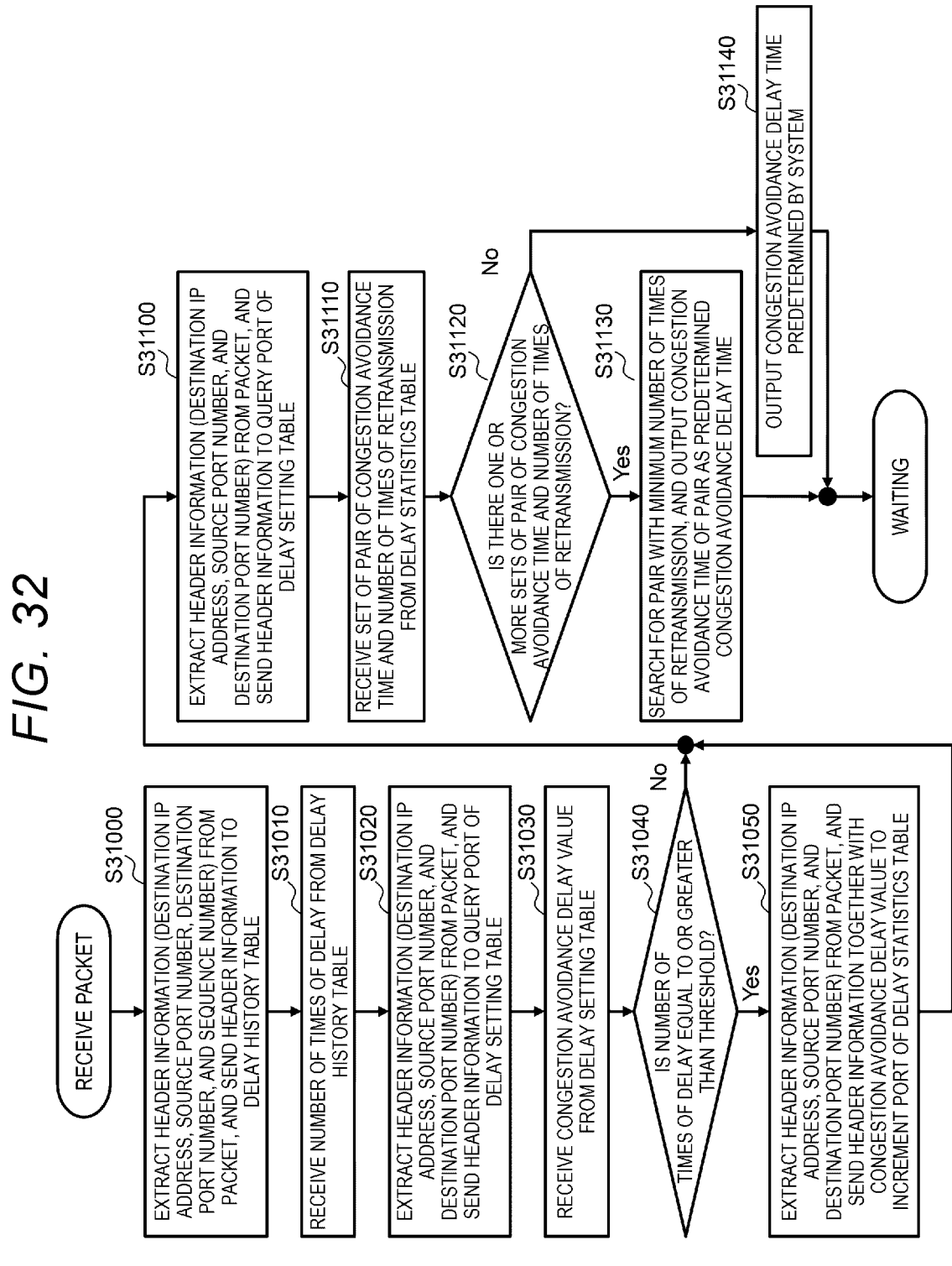
FIG. 32 is an operating flowchart of the delay statistics calculator.

FIG. 32 is an operating flowchart of the delay statistics calculator 2000 according to Embodiment 3. When a packet is received, the delay statistics calculator 2000 starts processing from step 31000.

Step 31000: The header separator 1110 of the delay statistics calculator 2000 extracts header information (destination IP address, source port number, destination port number, and sequence number) from the packet, and sends the header information to the delay history table 1600. Thereafter, the process proceeds to step 31010.

Step 31010: The delay statistics calculator 2000 receives the number of times of delay from the delay history table 1600. Thereafter, the process proceeds to step 31020.

Step 31020: The header separator 1110 of the delay statistics calculator 2000 extracts the header information (destination IP address, source port number, and destination port number) from the packet, and sends the header information to the query port of the delay setting table 1700. Thereafter, the process proceeds to step 31030.

Step 31030: The delay statistics calculator 2000 receives a congestion avoidance delay value from the delay setting table 1700. Thereafter, the process proceeds to step 31040.

Step 31040: The delay statistics calculator 2000 determines whether the number of times of delay is equal to or greater than a threshold. If the number of times of delay is equal to or greater than the threshold, the process proceeds to step 31050. If the number of times of delay is less than the threshold, the process proceeds to step 31100.

Step 31050: The header separator 1110 of the delay statistics calculator 2000 extracts the header information (destination IP address, source port number, and destination port number) from the packet, and sends the header information together with the congestion avoidance delay value to an increment port of the delay statistics table 2100. Thereafter, the process proceeds to step 31100.

Step 31100: The header separator 1110 of the delay statistics calculator 2000 extracts the header information (destination IP address, source port number, and destination port number) from the packet, and sends the header information to the query port of the delay statistics table 2100. Thereafter, the process proceeds to step 31110.

Step 31110: The predetermined congestion delay time calculation unit 2010 of the delay statistics calculator 2000 receives a set of a pair of the congestion avoidance time and the number of times of retransmission from the delay statistics table 2100. Thereafter, the process proceeds to step 31120.

Step 31120: The predetermined congestion delay time calculation unit 2010 determines whether there is one or more sets of a pair of the congestion avoidance time and the number of times of retransmission. If there is one or more sets of a pair of the congestion avoidance time and the number of times of retransmission, the process proceeds to step 31130. If there is no pair of the congestion avoidance time and the number of times of retransmission, the process proceeds to step 31140.

Step 31130: The predetermined congestion delay time calculation unit 2010 searches for a pair with the minimum number of times of retransmission, and outputs the congestion avoidance time of the pair as a predetermined congestion avoidance delay time. Thereafter, the process returns to the waiting state.

Step 31140: The predetermined congestion delay time calculation unit 2010 outputs a congestion avoidance delay time predetermined by the system. Thereafter, the process returns to the waiting state.

Figure 33:
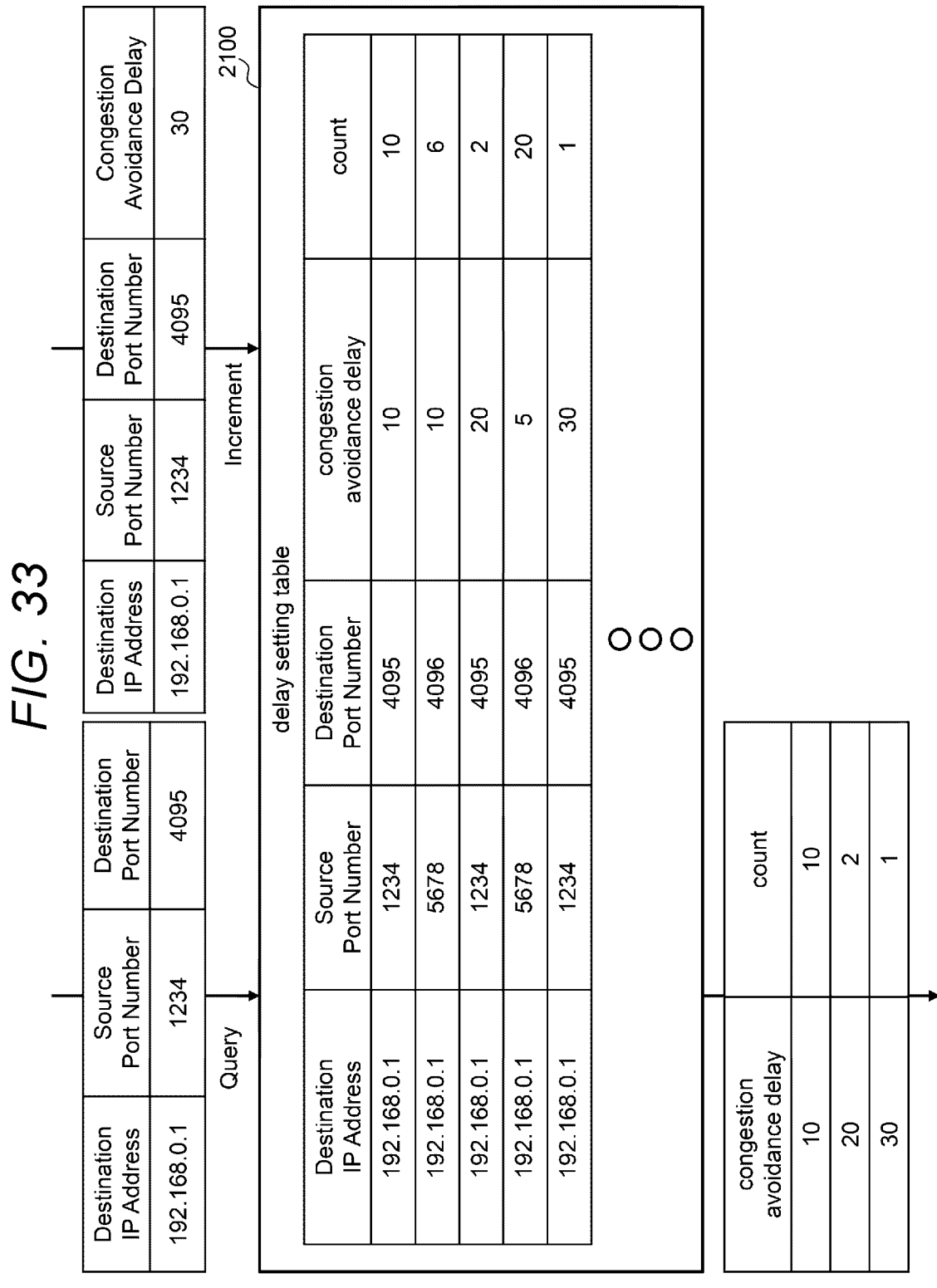
FIG. 33 is a configuration diagram of a delay statistics table.

FIG. 33 is a configuration diagram of the delay statistics table 2100. The delay statistics table stores a plurality of rows including a destination IP address, a source port number, a destination port number, a congestion avoidance delay time, and the number of times of retransmission. When a query including a destination IP address, a source port number, and a destination port number is given to the query port, a row matching the destination IP address, the source port number, and the destination port number is searched for, and sets of a congestion avoidance delay time and the number of times of retransmission of all rows matching a search condition are output. When an increment instruction including a destination IP address, a source port number, a destination port number, and a congestion avoidance delay time is given to an increment port, a row matching the destination IP address, the source port number, the destination port number, and the congestion avoidance delay time is searched for, and the number of times of retransmission in the matching row is incremented by 1. When there is no row matching the search condition, a row that includes a destination IP address, a source port number, a destination port number, a congestion avoidance delay time, and the number of times of retransmission set to 1 is newly added.

Figure 34:
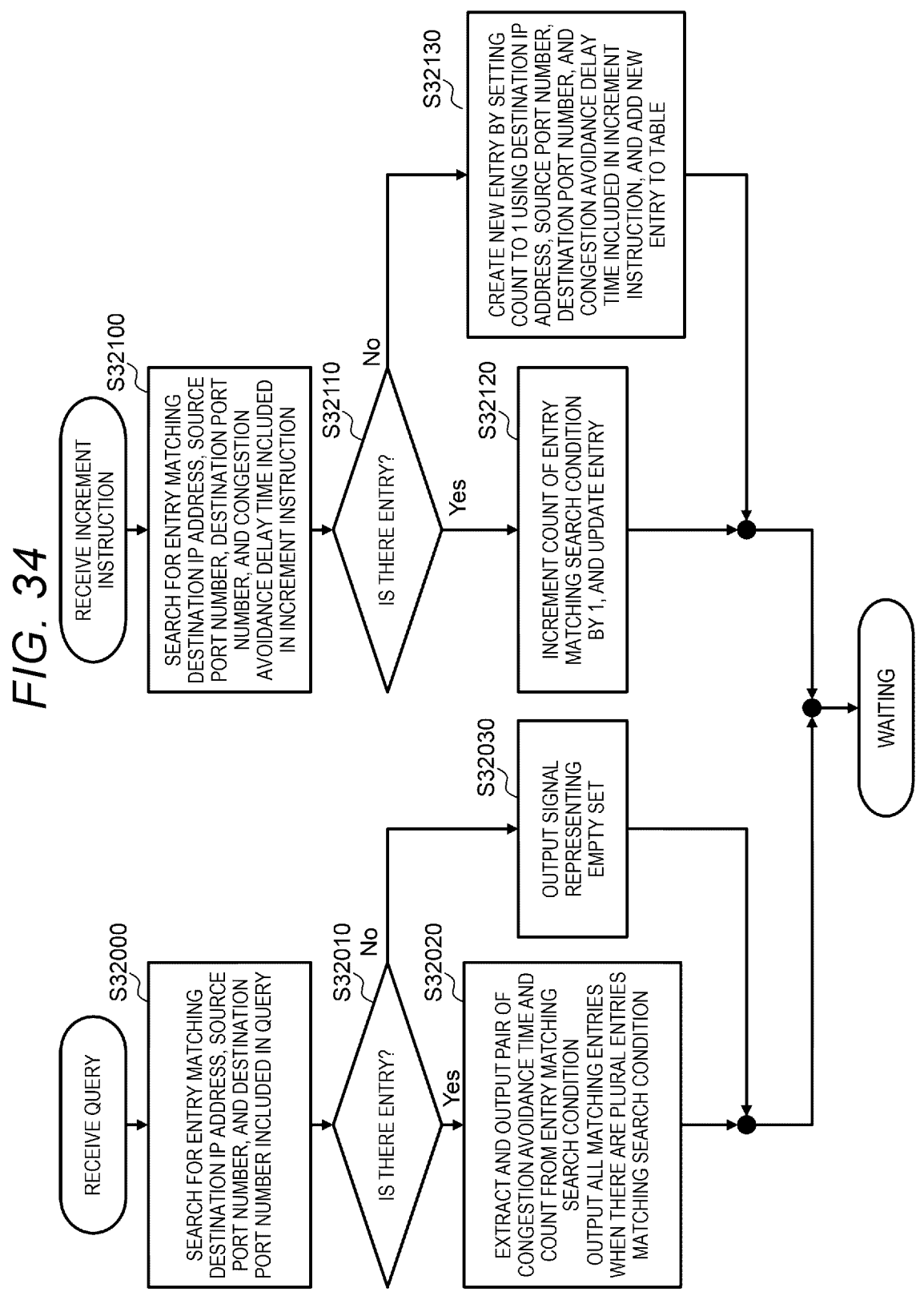
FIG. 34 is an operating flowchart of the delay statistics table.

FIG. 34 is an operating flowchart of the delay statistics table 2100.

When a query is received, the delay statistics table 2100 starts processing from step 32000.

Step 32000: The delay statistics table 2100 is searched for an entry matching a destination IP address, a source port number, and a destination port number included in the query. Thereafter, the process proceeds to step 32010.

Step 32010: The delay statistics table 2100 determines whether there is an entry matching a search condition. If there is an entry matching the search condition, the process proceeds to step 32020. If there is no entry matching the search condition, the process proceeds to step 32030.

Step 32020: The delay statistics table 2100 extracts and outputs a pair of a congestion avoidance time and a count from the entry matching the search condition. When there are a plurality of entries matching the search condition, all matching entries are output. Thereafter, the process returns to the waiting state.

Step 32030: The delay statistics table 2100 outputs a signal representing an empty set. Thereafter, the process returns to the waiting state.

When the increment instruction is received, the delay statistics table 2100 starts processing from step 32100.

Step 32100: The delay statistics table 2100 is searched for an entry matching the destination IP address, the source port number, the destination port number, and the congestion avoidance delay time included in the increment instruction. Thereafter, the process proceeds to step 32110.

Step 32110: The delay statistics table 2100 determines whether there is an entry matching a search condition. If there is an entry matching the search condition, the process proceeds to step 32120. If there is no entry matching the search condition, the process proceeds to step 32130.

Step 32120: The delay statistics table 2100 increments a count of the entry matching the search condition by 1, and updates the entry. Thereafter, the process returns to the waiting state.

Step 32030: The delay statistics table 2100 creates a new entry by setting the count to 1 using the destination IP address, the source port number, the destination port number, and the congestion avoidance delay time included in the increment instruction, and adds the new entry to the table. Thereafter, the process returns to the waiting state.

Figure 35:
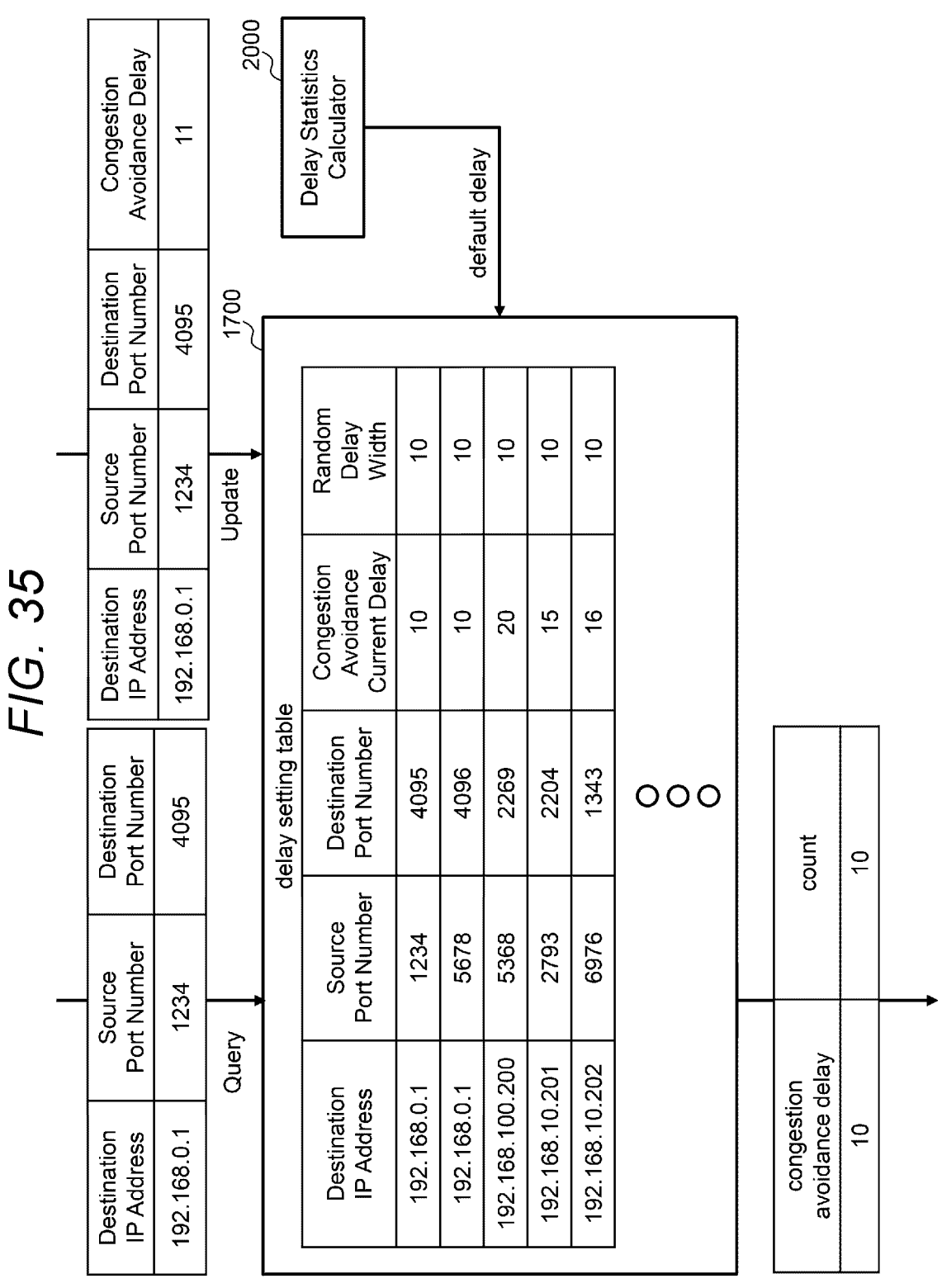
FIG. 35 is a configuration diagram of a delay setting table according to Embodiment 3.

FIG. 35 shows a configuration diagram of the delay setting table 1700 according to Embodiment 3. A difference from Embodiment 1 is that a path is added in which a predetermined congestion avoidance delay time to be referred to when there is no row matching a query condition in the table is acquired from the delay statistics calculator 2000. Operations other than the operation of referring to the predetermined value of the congestion avoidance delay time are the same as those in Embodiment 1.

Figure 36:
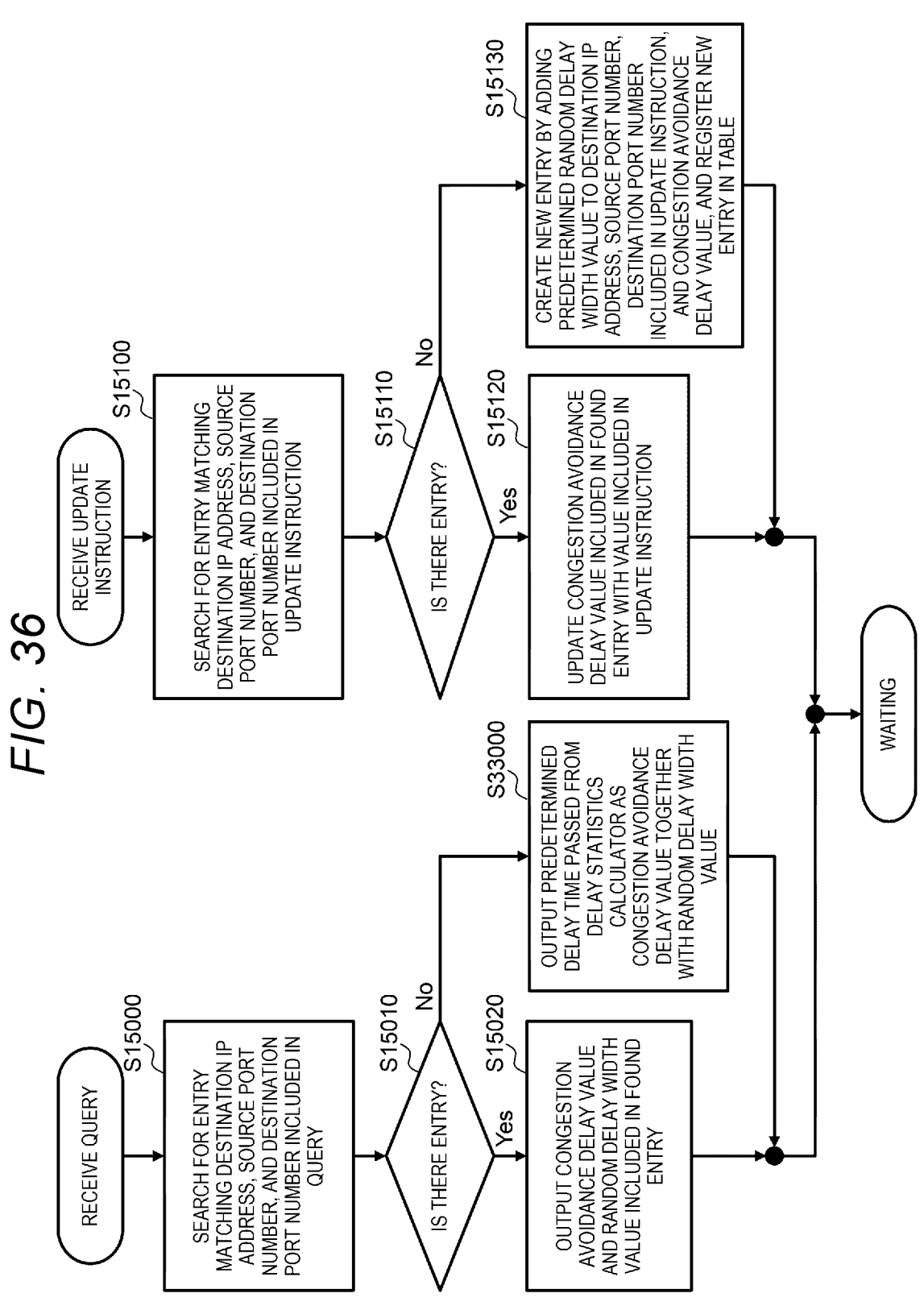
FIG. 36 is an operating flowchart of the delay setting table according to Embodiment 3.

FIG. 36 is an operating flowchart of the delay setting table 1700 according to Embodiment 3. In the flowchart, as a result of the determination in step 15010, when there is no entry matching the query condition, the process proceeds to step 33000.

Step 33000: The delay setting table 1700 outputs a predetermined delay time passed from the delay statistics calculator 2000 as a congestion avoidance delay value together with a random delay width value. Thereafter, the process returns to the waiting state.

The other processing is the same as that of the delay setting table 1700 of Embodiment 1, and thus the description thereof will be omitted.

As described above, the disclosed calculator system is connected to a network including a network switch, includes a plurality of calculators, and recovers, when a data packet is lost on the network, a transfer operation of the lost data packet by a retransmission operation. The calculator system includes calculators (200); software (100) running on the calculators; and a timing adjusting mechanism (1000) present between the calculators and the network. The timing adjusting mechanism is configured to calculate a delay time for delaying transmission of a data packet transmitted from the software based on characteristics of the data packet, and delay the transmission of the data packet by the calculated delay time.

By introducing a mechanism of the present invention, a retransmitted packet is transmitted with a delay time different from that of a large number of instances at the time of congestion occurrence, and is prevented from being involved in congestion due to simultaneous transmission of the retransmitted packets. In addition, even when a duration of the congestion changes depending on an operation state of other instances, by automatically adjusting an appropriate delay time for avoiding congestion by an automatic adjusting mechanism, the delay time is adjusted to a minimum necessary delay time depending on a change in a communication state, and an influence caused by inserting a delay is minimized.

Therefore, the congestion can be avoided efficiently.

The timing adjusting mechanism is configured to determine whether to delay the transmission of the data packet based on the characteristics of the data packet.

In addition, the timing adjusting mechanism is configured to calculate the delay time by adding a random value to a fixed time determined from the characteristics of the data packet.

Accordingly, the disclosed calculator system can easily obtain an appropriate delay time.

The timing adjusting mechanism is configured to, for a fixed time determined from the characteristics of the data packet in the delay time, increment the number of times of detection of continuous retransmission to a destination of a data packet having the same content when it is detected that the data packet is continuously retransmitted a first threshold number of times or more, increase a fixed time of a delay time set for transmission to the destination by a set width when it is detected that the number of times of detection of the continuous retransmission is equal to or greater than a second threshold number of times, increment the number of times of detection of discontinuous retransmission to a destination of a data packet having the same content when it is detected that the data packet is retransmitted only less than a third threshold number of times, and decrease a fixed time of a delay time set for transmission to the destination by a set width when it is detected that the number of times of detection of the discontinuous retransmission is equal to or greater than a fourth threshold number of times, thereby automatically adjusting the fixed time according to a state of the network.

Therefore, a delay time suitable for the state of the network is obtained, and congestion can be avoided efficiently.

The network is a public network shared by the plurality of calculators.

Even if there is no information on what other instance exists in the disclosed network, the disclosed calculator system can implement congestion avoidance.

The timing adjusting mechanism may be configured to receive a statistical value related to a congestion occurrence time from the network switch and calculate a time for delaying transmission from the statistical value.

With the configuration, the calculator system can avoid congestion with high accuracy by obtaining information on congestion from the network switch. The configuration in which the delay time is calculated by obtaining the information on the congestion from the network switch is preferably selectively applied to a specific type of instance. This is to avoid a situation in which a plurality of instances that obtain information from network switches calculate the same delay time and the congestion is repeated. A specific type is an instance responsible for alive monitoring as an example.

The timing adjusting mechanism may be configured to record a correspondence relation between the delay time and the number of times of continuous retransmission, set a delay time when the number of times of continuous retransmission is the smallest from the correspondence relation as a predetermined value of the delay time, and calculate a delay time to be applied to the data packet based on the predetermined value.

With the configuration, an appropriate delay time can be quickly obtained.

Although some embodiments have been described above, the embodiments are examples for describing the present invention, and are not intended to limit the scope of the present invention to the embodiments. The present invention can be implemented in various other forms.

For example, although an embodiment in which a through path is provided for a packet that is not retransmitted has been described, a configuration may be employed in which a delay time is set to be extremely short (for example, set to be 0) instead of providing a separate path for the packet that is not retransmitted.

What is claimed is:

1. A calculator system, which is connected to a network including a network switch, recovers, when a data packet is lost on the network, a transfer operation of the lost data packet by a retransmission operation, the calculator system comprising:
a plurality of calculators;
software running on the calculators; and
a timing adjusting mechanism present between the calculators and the network,
wherein the timing adjusting mechanism is configured to:
calculate a delay time for delaying transmission of a data packet transmitted from the software based on characteristics of the data packet,
delay the transmission of the data packet by the calculated delay time,
for a fixed time determined from the characteristics of the data packet in the delay time:
increment the number of times of detection of continuous retransmission to a destination of a data packet having the same content when it is detected that the data packet is continuously retransmitted a first threshold number of times or more,
increase a fixed time of a delay time set for transmission to the destination by a set width when it is detected that the number of times of detection of the continuous retransmission is equal to or greater than a second threshold number of times, increment the number of times of detection of discontinuous retransmission to a destination of a data packet having the same content when it is detected that the data packet is retransmitted only less than a third threshold number of times, and
decrease a fixed time of a delay time set for transmission to the destination by a set width when it is detected that the number of times of detection of the discontinuous retransmission is equal to or greater than a fourth threshold number of times, thereby automatically adjusting the fixed time according to a state of the network.

2. The calculator system according to claim 1, wherein the timing adjusting mechanism is configured to determine whether to delay the transmission of the data packet based on the characteristics of the data packet.

3. The calculator system according to claim 1, wherein the timing adjusting mechanism is configured to calculate the delay time by adding a random value to a fixed time determined from the characteristics of the data packet.

4. The calculator system according to claim 1, wherein the network is a public network shared by the plurality of calculators.

5. The calculator system according to claim 1, wherein the timing adjusting mechanism is configured to
receive a statistical value related to a congestion occurrence time from the network switch, and
calculate a time for delaying transmission from the statistical value.

6. A calculator system, which is connected to a network including a network switch, recovers, when a data packet is lost on the network, a transfer operation of the lost data packet by a retransmission operation, the calculator system comprising:
a plurality of calculators;
software running on the calculators; and
a timing adjusting mechanism present between the calculators and the network,
wherein the timing adjusting mechanism is configured to:
calculate a delay time for delaying transmission of a data packet transmitted from the software based on characteristics of the data packet, and
delay the transmission of the data packet by the calculated delay time,
wherein the timing adjusting mechanism is configured to;
record a correspondence relation between the delay time and the number of times of continuous retransmission,
set a delay time when the number of times of continuous retransmission is the smallest from the correspondence relation as a predetermined value of the delay time, and
calculate a delay time to be applied to the data packet based on the predetermined value.

7. A congestion avoidance method for a calculator system, the calculator system including a plurality of calculators and being connected to a network including a network switch, and the calculator system recovering, when a data packet is lost on the network, a transfer operation of the lost data packet by a retransmission operation, the congestion avoidance method comprising:
a timing adjusting mechanism present between the network and the calculators on which software is running, the timing adjusting mechanism performing:
acquiring characteristics of a data packet transmitted from the software;

calculating a delay time for delaying transmission of the data packet based on the characteristics of the data packet; and delaying the transmission of the data packet by the calculated delay time, for a fixed time determined from the characteristics of the data packet in the delay time:

incrementing the number of times of detection of continuous retransmission to a destination of a data packet having the same content when it is detected that the data packet is continuously retransmitted a first threshold number of times or more;

increasing a fixed time of a delay time set for transmission to the destination by a set width when it is detected that the number of times of detection of the continuous retransmission is equal to or greater than a second threshold number of times;

incrementing the number of times of detection of discontinuous retransmission to a destination of a data packet having the same content when it is detected that the data packet is retransmitted only less than a third threshold number of times; and decreasing a fixed time of a delay time set for transmission to the destination by a set width when it is detected that the number of times of detection of the discontinuous retransmission is equal to or greater than a fourth threshold number of times, thereby automatically adjusting the fixed time according to a state of the network.

\* \* \* \* \*